(12) United States Patent
Park et al.

(10) Patent No.: US 12,550,183 B2
(45) Date of Patent: Feb. 10, 2026

(54) METHOD AND APPARATUS FOR TRANSMISSION OR RECEPTION OF UPLINK CONTROL AND DATA CHANNEL IN WIRELESS COMMUNICATION SYSTEM

(71) Applicant: Samsung Electronics Co., Ltd., Suwon-si (KR)

(72) Inventors: Sungjin Park, Suwon-si (KR); Taehyoung Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 694 days.

(21) Appl. No.: 17/789,987

(22) PCT Filed: Dec. 28, 2020

(86) PCT No.: PCT/KR2020/019205
§ 371 (c)(1),
(2) Date: Jun. 29, 2022

(87) PCT Pub. No.: WO2021/137554
PCT Pub. Date: Jul. 8, 2021

(65) Prior Publication Data
US 2023/0105294 A1  Apr. 6, 2023

(30) Foreign Application Priority Data
Dec. 30, 2019  (KR) .................... 10-2019-0178504

(51) Int. Cl.
*H04W 72/566* (2023.01)
*H04W 72/1268* (2023.01)

(52) U.S. Cl.
CPC ..... *H04W 72/569* (2023.01); *H04W 72/1268* (2013.01)

(58) Field of Classification Search
CPC .......... H04W 72/569; H04W 72/1268; H04W 72/33; H04W 72/23; H04W 72/21;
(Continued)

(56) References Cited

U.S. PATENT DOCUMENTS

| 11,032,803 B2 | 6/2021 | Lee et al. | |
| 2013/0039231 A1* | 2/2013 | Wang | H04W 72/56 370/280 |

(Continued)

FOREIGN PATENT DOCUMENTS

| CA | 3063502 A1 * | 12/2019 | ......... H04L 27/0008 |
| CN | 105794280 A | 7/2016 | |

(Continued)

OTHER PUBLICATIONS

Qualcomm Incorporated, PDCCH Enhancements for eURLLC, R1-1909264, 3GPP TSG RAN WG1 Meeting #98, Aug. 17, 2019, Prague, Czech Republic.

(Continued)

*Primary Examiner* — Sujoy K Kundu
*Assistant Examiner* — Vladislav Y Agureyev
(74) *Attorney, Agent, or Firm* — Jefferson IP Law, LLP

(57) ABSTRACT

The present disclosure provides a method, performed by a terminal, of transmitting uplink control information, the method including: receiving configuration information about a channel type through which at least one piece of uplink control information is to be transmitted; and transmitting at least one piece of uplink control information through at least one channel, based on a priority of the at least one piece of uplink control information and the received configuration information.

8 Claims, 17 Drawing Sheets

(58) Field of Classification Search
CPC ... H04L 1/1664; H04L 1/1671; H04L 1/1819; H04L 1/1822; H04L 1/1864; H04L 1/1893; H04L 5/0064; H04L 5/0044; H04L 5/0094; H04L 5/0053

See application file for complete search history.

(56) References Cited

U.S. PATENT DOCUMENTS

| | | | |
|---|---|---|---|
| 2013/0223301 A1 | 8/2013 | Lee et al. | |
| 2014/0023008 A1 | 1/2014 | Ahn et al. | |
| 2015/0215944 A1* | 7/2015 | Kim | H04L 5/001 370/329 |
| 2015/0223230 A1* | 8/2015 | Liang | H04L 1/0031 370/329 |
| 2016/0381674 A1 | 12/2016 | Kim et al. | |
| 2017/0238296 A1 | 8/2017 | Lee et al. | |
| 2017/0273032 A1* | 9/2017 | Qin | H04W 74/0833 |
| 2018/0007637 A1* | 1/2018 | Yang | H04W 52/58 |
| 2018/0124712 A1* | 5/2018 | Lin | H04W 52/0209 |
| 2018/0295587 A1 | 10/2018 | Kim et al. | |
| 2019/0132861 A1 | 5/2019 | Koorapaty et al. | |
| 2019/0159136 A1* | 5/2019 | MolavianJazi | H04W 52/362 |
| 2019/0165896 A1* | 5/2019 | Huang | H04L 1/1664 |
| 2019/0174517 A1* | 6/2019 | Wang | H04W 72/21 |
| 2019/0260523 A1 | 8/2019 | Yang et al. | |
| 2019/0313342 A1* | 10/2019 | Papasakellariou | H04W 52/48 |
| 2019/0313436 A1* | 10/2019 | Lee | H04L 5/0094 |
| 2019/0327759 A1* | 10/2019 | Lee | H04L 5/0053 |
| 2020/0037260 A1* | 1/2020 | Fu | H04W 52/325 |
| 2020/0037314 A1* | 1/2020 | Xiong | H04L 1/1812 |
| 2020/0053657 A1* | 2/2020 | MolavianJazi | H04W 52/367 |
| 2020/0169960 A1* | 5/2020 | Dinan | H04W 52/06 |
| 2020/0177424 A1* | 6/2020 | Noh | H04L 5/0091 |
| 2020/0196343 A1* | 6/2020 | Marinier | H04L 5/0092 |
| 2020/0204308 A1* | 6/2020 | Chen | H04W 72/1268 |
| 2020/0205088 A1* | 6/2020 | Yang | H04W 72/12 |
| 2020/0259625 A1* | 8/2020 | Papasakellariou | H04B 7/0456 |
| 2020/0305094 A1* | 9/2020 | Ouchi | H04W 52/325 |
| 2020/0314900 A1* | 10/2020 | Hosseini | H04W 72/56 |
| 2020/0351025 A1* | 11/2020 | Choi | H04L 1/0693 |
| 2021/0037555 A1* | 2/2021 | Papasakellariou | H04L 1/0026 |
| 2021/0058922 A1* | 2/2021 | Han | H04L 5/0055 |
| 2021/0100024 A1 | 4/2021 | Bang et al. | |
| 2021/0105126 A1* | 4/2021 | Yi | H04L 1/1671 |
| 2021/0105766 A1* | 4/2021 | Wang | H04L 1/1819 |
| 2021/0306120 A1* | 9/2021 | Chen | H04L 5/0035 |
| 2022/0039127 A1* | 2/2022 | Li | H04W 72/1268 |
| 2022/0060097 A1* | 2/2022 | Dinan | H04L 27/00 |
| 2022/0150924 A1* | 5/2022 | Gao | H04W 72/1268 |
| 2022/0183039 A1* | 6/2022 | Matsumura | H04B 7/06968 |
| 2022/0279453 A1* | 9/2022 | Dinan | H04W 52/362 |
| 2023/0156713 A1* | 5/2023 | Yang | H04W 72/56 370/329 |
| 2024/0007969 A1* | 1/2024 | Pietraski | H04W 36/06 |
| 2025/0056545 A1* | 2/2025 | Lee | H04W 72/0446 |
| 2025/0056621 A1* | 2/2025 | Dinan | H04W 74/0836 |

FOREIGN PATENT DOCUMENTS

| | | | | |
|---|---|---|---|---|
| CN | 106688202 A | | 5/2017 | |
| CN | 103581891 B | * | 1/2019 | ............ H04L 1/0026 |
| CN | 109787728 A | * | 5/2019 | ............ H04B 1/1713 |
| CN | 109997327 A | | 7/2019 | |
| CN | 110249689 A | * | 9/2019 | ............... H04L 5/00 |
| CN | 110474747 A | * | 11/2019 | ............ H04L 1/1664 |
| CN | 110798892 A | * | 2/2020 | ......... H04W 72/0413 |
| CN | 110972286 A | * | 4/2020 | ............ H04L 5/0053 |
| CN | 111345076 A | * | 6/2020 | ............. H04L 5/001 |
| EP | 3668239 A1 | * | 6/2020 | ............ H04W 16/28 |
| KR | 10-2012-0074254 A | | 7/2012 | |
| KR | 10-2015-0028693 A | | 3/2015 | |
| KR | 10-2021-0037375 A | | 4/2021 | |
| WO | WO-2018129085 A1 | * | 7/2018 | ............ H04L 1/1607 |
| WO | WO-2018182383 A1 | * | 10/2018 | ............ H04L 1/1861 |
| WO | WO-2018194352 A1 | * | 10/2018 | ......... H04L 27/2601 |
| WO | WO-2019005920 A1 | * | 1/2019 | ............... H04L 1/08 |

OTHER PUBLICATIONS

Qualcomm Incorporated, UCI Enhancements for eURLLC, R1-1909265, 3GPP TSG RAN WG1 Meeting #98, Aug. 17, 2019, Prague, Czech Republic.

Ericsson, UCI Enhancements for NR URLLC, R1-1908122, 3GPP TSG RAN WG1 Meeting #98, Aug. 17, 2019, Prague, Czech Republic.

OPPO, UCI enhancements for URLLC, R1-1908668, 3GPP TSG RAN WG1 Meeting #98, Aug. 17, 2019, Prague, Czech Republic.

International Search Report dated Mar. 30, 2021, issued in International Application No. PCT/KR2020/019205.

Nokia et al., On UCI Enhancements for NR URLLC, R1-1912512, 3GPP TSG RAN WG1 #99, Nov. 9, 2019, Reno, USA, XP051823452.

Qualcomm Incorporated, UCI Enhancements for eURLLC, R1-1909575, 3GPP TSG-RAN WG1 #98, Sep. 3, 2019, Prague, Czech Republic, XP051766172.

European Search Report dated Dec. 8, 2022, issued in European Application No. 20908612.3.

3rd Generation Partnership Project; Technical Specification Group Radio Access Network; Evolved Universal Terrestrial Radio Access (E-UTRA); Radio Resource Control (RRC); Protocol specification (Release 15), 3GPP Draft; R2-1809067 TS 36.331 Baseline CR for the UE Capabilities_Almost _Final, XP051520403, May 25, 2018.

Chinese Office Action dated Aug. 12, 2024, issued in Chinese Patent Application No. 202080091447.8.

European Office Action dated Oct. 9, 2024, issued in European Patent Application No. 20908612.3.

Huawei et al., UCI enhancements for URLLC, R1-1908052, 3GPP TSG RAN WG1 Meeting #98, Aug. 17, 2019.

Qualcomm Incorporated, Summary of remaining issues for overlapping UL transmissions, R1-1807677, 3GPP TSG RAN WG1 Meeting #93, May 24, 2018.

Korean Office Action dated Mar. 12, 2025, issued in Korean Patent Application No. 10-2019-0178504.

Chinese Office Action dated Jan. 25, 2025, issued in Chinese Patent Application No. 202080091447.8.

Chinese Notice of Allowance dated Jun. 17, 2025, issued in Chinese Patent Application No. 202080091447.8.

Ericsson, Frame Structure for D2D-Enabled LTE Carriers and Resources Configuration, R1-143367, 3GPP TSG-RAN WG1 Meeting #78, Aug. 10, 2014.

Korean Decision to Refuse dated Nov. 7, 2025, issued in Korean Patent Application No. 10-2019-0178504.

* cited by examiner

METHOD AND APPARATUS FOR TRANSMISSION OR RECEPTION OF UPLINK CONTROL AND DATA CHANNEL IN WIRELESS COMMUNICATION SYSTEM

TECHNICAL FIELD

The present disclosure relates to a method and apparatus for transmission or reception of control and data channels in a wireless communication system.

BACKGROUND ART

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. 5G communication systems defined by $3^{rd}$ generation partnership project (3GPP) is called new radio (NR) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and received-interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology. As it is possible to provide various services according to those described above and the development of wireless communication systems, there is a need for a method of efficiently transmitting and receiving control channels and data channels.

DESCRIPTION OF EMBODIMENTS

Technical Problem

The present disclosure provides a method and apparatus for transmitting control and data channels in a wireless communication system.

Solution to Problem

The present disclosure provides a method and apparatus for efficiently transmitting control and data channels in a wireless communication system.

Advantageous Effects of Disclosure

Embodiments of the present disclosure provide efficient communication methods.

BEST MODE

Figure 1:
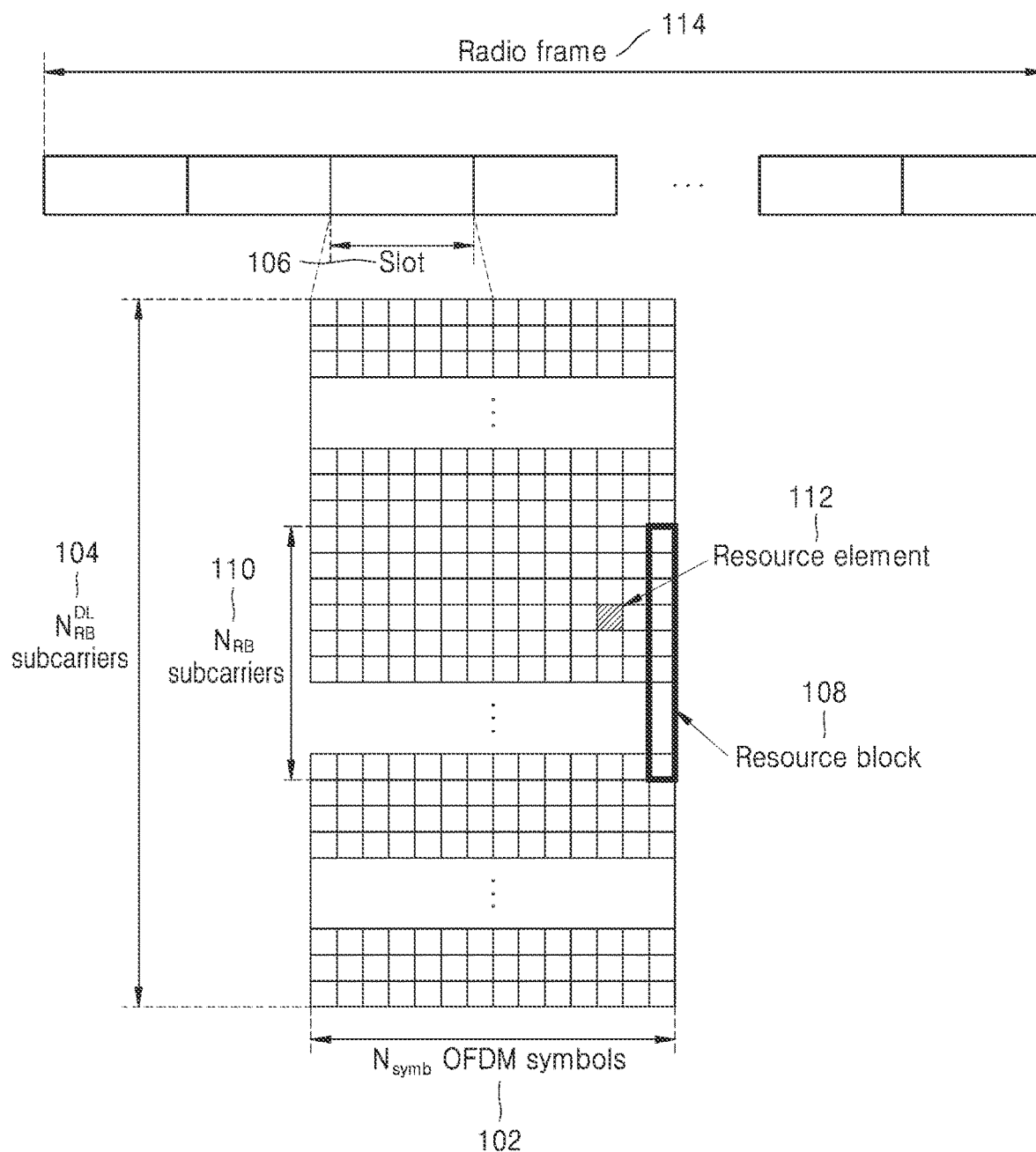
FIG. 1 is a diagram illustrating a transmission structure of a time-frequency domain that is a radio resource domain in a 5th generation (5G) system or a new radio (NR) system, according to an embodiment of the present disclosure.

According to an embodiment of the present disclosure, a scheduling method by a base station may include: determining a channel type through which at least one piece of uplink control information is to be transmitted; providing, to a terminal, configuration information based on a result of the determining; and receiving the at least one piece of uplink control information based on the configuration information.

The determining the channel type through which the at least one piece of uplink control information may include determining to transmit at least one of the at least one piece of uplink control information on an uplink control channel, and determining to transmit at least one of the at least one piece of uplink control information on an uplink data channel.

The configuration information may be included in a certain field of downlink control information, a resource for transmitting the uplink data channel may be determined based on time and frequency resource information of a physical uplink control channel (PUCCH) resource indicator (PRI) field, and configuration of frequency hopping, hybrid automatic repeat request (HARQ) process identifier (ID), new data indicator (NDI), modulation and coding scheme (MCS), and redundancy version (RV) information for transmission of the uplink data channel may be set by information previously configured through a higher layer signal.

The channel type to transmit the uplink control information may be determined based on a priority of the uplink control information.

The priority of the uplink control information may be determined based on a service type.

According to an embodiment of the present disclosure, a method, performed by a terminal, of transmitting uplink control information may include: receiving configuration information about a channel type through which at least one piece of uplink control information is to be transmitted; and transmitting at least one piece of uplink control information through at least one channel, based on a priority of the at least one piece of uplink control information and the received configuration information.

The transmitting of the at least one piece of uplink control information through the at least one channel, based on the priority of the at least one piece of uplink control information and the received configuration information, may include, when two or more pieces of uplink control information having a same priority are configured to be transmitted through respective uplink control channels, multiplexing the two or more pieces of uplink control information and transmitting multiplexed information on one uplink control channel.

The transmitting of the at least one piece of uplink control information through the at least one channel, based on the priority of the at least one piece of uplink control information and the received configuration information, may include, when two or more pieces of uplink control information having different priorities from each other are configured to be transmitted through respective uplink control channels, transmitting the two or more pieces of uplink control information on different uplink control channels from each other, or transmitting only uplink control information having a highest priority.

The transmitting of the at least one piece of uplink control information through the at least one channel, based on the priority of the at least one piece of uplink control information and the received configuration information, may include transmitting at least one of the at least one piece of uplink control information on an uplink control channel, and transmitting at least one of the at least one piece of uplink control information on an uplink data channel.

The transmitting of the at least one piece of uplink control information through the at least one channel, based on the priority of the at least one piece of uplink control information and the received configuration information, may include, when two or more pieces of uplink control information having a same priority are configured to be transmitted on the uplink control channel and the uplink data channel, multiplexing the two or more pieces of uplink control information and transmitting multiplexed information on one uplink control channel.

According to an embodiment of the present disclosure, a communication method of a terminal may include: determining whether to simultaneously transmit an uplink control channel and an uplink data channel; receiving scheduling information for at least one uplink control channel and at least one uplink data channel; identifying whether time resources allocated for transmission of the at least one uplink control channel and the at least one uplink data channel overlap, based on the scheduling information; determining one uplink control channel and one uplink data channel to be transmitted, based on a result of determining whether to perform the simultaneous transmission and a result of the identifying; and transmitting the determined one uplink control channel and the determined one uplink data channel.

The determining of whether the time resources allocated for transmission of the at least one uplink control channel and the at least one uplink data channel overlap may include determining whether time resources allocated for transmission of the at least one uplink control channel overlap, and determining whether time resources allocated for transmission of the at least one uplink data channel overlap.

The transmitting of the determined one uplink control channel and the determined one uplink data channel may include determining whether to transmit uplink control information by piggybacking the uplink control information on the one uplink data channel.

The determining of whether to transmit the uplink control information by piggybacking the uplink control information on the one uplink data channel may include performing determination based on at least one field of downlink control information.

The determining of whether to transmit the uplink control information by piggybacking the uplink control information on the one uplink data channel may be determined, further considering a result of determining whether the allocated time resources overlap.

The at least one field of the downlink control information may include an uplink shared channel (UL-SCH) indicator field and a channel state information (CSI) request field.

The determining of the one uplink control channel and the one uplink data channel to be transmitted, based on the result of determining whether to perform the simultaneous transmission and the result of the identifying may include: when time resources allocated for transmission of uplink data channels having different priorities from each other overlap, selecting an uplink data channel having a highest priority; when time resources allocated for transmission of uplink control channels having different priorities from each other overlap, selecting an uplink data channel having a highest priority; and when uplink control information included in an uplink control channel is multiplexed on an uplink data channel, not selecting an uplink control channel corresponding to the multiplexed uplink control information.

Uplink control information corresponding to the uplink control channel having the highest priority may be transmitted by piggybacking the uplink control information on the uplink data channel, and uplink control information corresponding to an uplink control channel having no highest priority may not be piggybacked on the uplink data channel.

The determining of whether to transmit the uplink control information by piggybacking the uplink control information on the at least one uplink data channel may include performing determination based on at least one of a downlink control information format, a type of the uplink control information, and priorities of the uplink control channel and the downlink control channel.

According to an embodiment of the present disclosure, a communication method of a base station may include: transmitting configuration information about whether to simultaneously transmit an uplink control channel and an uplink data channel; transmitting configuration information about whether to transmit uplink control information by piggybacking the uplink control information on an uplink data channel; transmitting scheduling information for at least one uplink control channel and at least one uplink data channel; and receiving one uplink control channel and one uplink data channel.

A base station according to an embodiment of the present disclosure may include: transceiver; and a processor connected to the transceiver and configured to determine a channel type through which at least one piece of uplink control information is to be transmitted, to provide, to a terminal, configuration information based on a result of the determining, and to receive the at least one piece of uplink control information based on the configuration information.

A terminal according to an embodiment of the present disclosure may include: a transceiver; and a processor connected to the transceiver and configured to receive configuration information about a channel type through which at least one piece of uplink control information is to be transmitted, and to transmit at least one piece of uplink control information through at least one channel, based on a priority of the at least one piece of uplink control information and the received configuration information.

A terminal according to an embodiment of the present disclosure may include: a transceiver; and a processor connected to the transceiver and configured to determine whether to simultaneously transmit an uplink control channel and an uplink data channel, to receive scheduling information for at least one uplink control channel and at least one uplink data channel, to identify whether time resources allocated for transmission of the at least one uplink control channel and the at least one uplink data channel overlap, based on the scheduling information, to determine one uplink control channel and one uplink data channel to be transmitted, based on a result of determining whether to perform the simultaneous transmission and a result of the identifying, and to transmit the determined one uplink control channel and the determined one uplink data channel.

A base station according to an embodiment of the present disclosure may include: a transceiver; and a processor connected to the transceiver and configured to transmit configuration information about whether to simultaneously transmit an uplink control channel and an uplink data channel, to transmit configuration information about whether to transmit uplink control information by piggybacking the uplink control information on an uplink data channel, to transmit scheduling information for at least one uplink control channel and at least one uplink data channel, and to receive one uplink control channel and one uplink data channel.

Mode of Disclosure

Hereinafter, embodiments will be described in detail with reference to the accompanying drawings.

In describing the embodiments, descriptions of technical contents that are well known in the technical field to which the present disclosure pertains and are not directly related to the present disclosure will be omitted. By omitting unnecessary description, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Advantages and features of the present disclosure, and methods of achieving them will be clarified with reference to embodiments described below in detail with reference to the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The present disclosure is only defined by the scope of the claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term " . . . er/or" as used herein refers to a software element or a hardware element such as field programmable gate array (FPGA) or application specific integrated circuit (ASIC), and the "module" or " . . . er/or" performs certain functions. However, the term " . . . er/or" is not limited to software or hardware. The term " . . . er/or" may be configured in an addressable storage medium or may be configured to reproduce one or more processors. Therefore, for example, the term " . . . er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the " . . . ers/ors" may be combined with fewer elements and " . . . ers/ors" or may be separated from additional elements and " . . . ers/ors." Furthermore, the elements and the " . . . ers/ors" may be implemented to reproduce one or more central processing units (CPUs) in the device or secure multimedia card. Also, in embodiments of the present disclosure, the " . . . er/or" may include one or more processors.

A wireless communication system has evolved from a system providing voice-oriented services to a broadband wireless communication system providing high speed high quality packet data services of communication standards such as high speed packet access (HSPA) of 3rd generation partnership project (3GPP), long term evolution (LTE) or evolved universal terrestrial radio access (E-UTRA), LTE-advanced (LTE-A), high rate packet data (HRPD) of 3GPP2, ultra mobile broadband (UMB), and Institute of Electrical and Electronics Engineers (IEEE) 802.16e. In addition, 5th generation (5G) or new radio (NR) communication standards for 5G wireless communication systems are being established.

In a 5G system or an NR system that is a representative example of a broadband wireless communication system, an orthogonal frequency division multiplexing (OFDM) scheme is employed in a downlink (DL) and an uplink (UL). More specifically, a cyclic-prefix OFDM (CP-OFDM) scheme is employed in a DL, and a discrete Fourier transform spreading OFDM (DFT-S-OFDM) scheme is employed in a UL along with CP-OFDM. The UL refers to a radio link through which a terminal (user equipment (UE) or mobile station (MS)) transmits data or a control signal to a base station (gNobe B, eNode B, or BS), and the DL refers to a radio link through which a base station transmits data or a control signal to a terminal. In the multiple access scheme as described above, data or control information of each user may be identified by performing allocation and operation so that time-frequency resources for carrying data or control information for each user do not overlap each other, that is, orthogonality is established.

The 5G systems or the NR system employs a hybrid automatic repeat request (HARQ) scheme for retransmitting the corresponding data in a physical layer when a decoding failure occurs in initial transmission. In the HARQ scheme, when a receiver fails to decode data correctly, the receiver transmits information (negative acknowledgement (NACK)) indicating a decoding failure to a transmitter, so that the transmitter retransmits the corresponding data in a physical layer. The receiver combines the data retransmitted by the transmitter with the previously decoding-failed data to improve data reception performance. Also, when the receiver decodes data correctly, the receiver transmits information (acknowledgement (ACK)) indicating a decoding success to the transmitter, so that the transmitter transmits new data.

On the other hand, a new radio access technology (NR) system, which is new communication, is being designed so that various services may be freely multiplexed on time and frequency resources. Accordingly, signal waveforms, numerologies, reference signals, and the like may be dynamically or freely allocated according to the needs of the corresponding services. In order to provide an optimal service to a terminal in wireless communication, it is important to optimize data transmission through measurement of channel quality and interference, and accordingly, accurate channel status measurement is required.

In 4G communication, channel and interference characteristics do not change greatly depending on frequency resources. However, in 5G or NR channels, channel and interference characteristics change greatly depending on the service. Therefore, It is necessary to support a frequency resource group (FRG)-level subset so as to measure channel and interference characteristics separately. On the other hand, in a 5G system or an NR system, the types of supported services may be divided into categories such as enhanced mobile broadband (eMBB), massive machine type communications (mMTC), and ultra-reliable and low-latency communications (URLLC). eMBB is a service that aims for high-speed transmission of high-capacity data, mMTC is a service that aims for minimization of terminal power and access of multiple terminals, and URLLC is a service that aims for high reliability and low latency. Different requirements may be applied according to the type of service applied to the terminal.

Of the services described above, the URLLC service aims for high reliability and low latency, and thus, control information and data information transmittable on a physical channel need to be transmitted at a low coding rate. In the case of control information, a repeated control information transmission function has already been introduced in LTE-MTC or narrow band Internet-of-things (NB-IoT) service. This is introduced to provide high coverage for terminals having a small bandwidth, and delay time has not been sufficiently taken into account. A minimum unit for repeated control information transmission is fixed in units of subframes on the basis of LTE. In order to support the URLLC service in the NR system or the 5G system, it is necessary to introduce a repeated control information transmission mode capable of improving reliability while requiring low latency. Therefore, in the present disclosure, a situation where control information is repeatedly transmitted in a slot is basically taken into account. Additionally, a situation where control information transmittable across a slot boundary is repeatedly transmitted is also taken into account. Through operations provided in the present disclosure, the terminal may detect control information transmitted from the base station more quickly with high reliability.

The terms as used herein are those defined by taking into account functions, but the terms may vary depending on the intention of users or those of ordinary skill in the art, precedents, or the like. Therefore, the definitions should be made based on the contents throughout the specification. Hereinafter, a base station allocates resources to a terminal, and may include at least one of a gNode B (gNB), an eNode B (eNB), a Node B, a BS, a radio access unit, a base station controller, or a node on a network. Examples of a terminal may include a UE, a MS, a cellular phone, a smartphone, a computer, or a multimedia system capable of performing a communication function. In the present disclosure, the DL refers to a radio transmission path of a signal transmitted from a base station to a terminal, and the UL refers to a radio transmission path of a signal transmitted from a terminal to a base station. Although the NR system will be described as an example, the present disclosure is not limited thereto. Embodiments of the present disclosure may also be applied to various communication systems having similar technical background or channel types. Also, the embodiments of the present disclosure may also be applied to other communication systems through some modifications without departing from the scope of the present disclosure.

In the present disclosure, the terms "physical channel" and "signal" may be used interchangeably with data or a control signal. For example, a physical downlink shared channel (PDSCH) is a physical channel through which data is transmitted, but PDSCH may also be referred to as data.

In the present disclosure, higher layer signaling is a signal transmission method by which a base station transmits a signal to a terminal by using a DL data channel of a physical layer, or a terminal transmits a signal to a base station by using a UL data channel of a physical layer. The higher layer signaling may also be referred to as radio resource control (RRC) signaling or media access control (MAC) control element (CE).

On the other hand, as research into next-generation communication systems is in progress, various methods of scheduling communication with a terminal are being discussed. Accordingly, there is a need for an efficient scheduling and data transmission and reception method considering characteristics of a next-generation communication system. Accordingly, in order to provide a plurality of services to a user in a communication system, there is a need for a method capable of providing each service within the same time interval according to characteristics of the corresponding service, and an apparatus using the same.

The NR system employs a HARQ scheme for retransmitting corresponding data in a physical layer when a decoding failure occurs in initial transmission. In the HARQ scheme, when a receiver fails to decode data correctly, the receiver transmits information (NACK) indicating a decoding failure to a transmitter, so that the transmitter retransmits the corresponding data in a physical layer. The receiver combines the data retransmitted by the transmitter with the previously decoding-failed data to improve data reception performance. Also, when the receiver decodes data correctly, the receiver transmits information (ACK) indicating a decoding success to the transmitter, so that the transmitter transmits new data.

Hereinafter, a method and apparatus for transmitting HARQ-ACK feedback for DL data transmission, according to the present disclosure, will be described. Specifically, a method of configuring HARQ-ACK feedback bits when a terminal transmits multiple HARQ-ACKs in one slot through a UL will be described.

In a wireless communication system, particularly in an NR system, a base station may configure one or more component carriers (CCs) in a terminal for DL transmission. Also, DL transmission and UL transmission slots and symbols may be configured on each CC.

On the other hand, when a PDSCH that is DL data is scheduled, at least one of slot timing information for mapping the PDSCH and information about a start symbol position to which the PDSCH is mapped within a corresponding slot and the number of symbols to which the PDSCH is mapped may be transmitted in a specific bit field of downlink control information (DCI). For example, in a case where the DCI is transmitted in slot n to schedule the PDSCH, when the slot timing information K0 for transmitting the PDSCH indicates 0, the start symbol position is 0, and the symbol length is 7, the corresponding PDSCH is transmitted by being mapped to seven symbols from symbol 0 of slot n.

On the other hand, the PDSCH that is a DL data signal is transmitted, and HARQ-ACK feedback is transmitted from a terminal to a base station after K1 slots. K1 information that is timing information for transmitting HARQ-ACK is transmitted through DCI. Available candidate sets of K1 value may be transmitted by higher layer signaling, and one of the candidates may be determined through DCI When the terminal is configured with a semi-static HARQ-ACK codebook, the terminal may determine a feedback bit (or a HARQ-ACK codebook size) to be transmitted by Table including at least one of slot information K0 for mapping the PDSCH, start symbol information, the number of symbols, and length information, and K1 candidate values that are HARQ-ACK feedback timing information for the PDSCH. Table including the slot information for mapping the PDSCH, the start symbol information, the number of symbols, or the length information may have default values. Also, there may be Table that the base station may set in the terminal.

When the terminal is configured with a dynamic HARQ-ACK codebook, the terminal may determine a HARQ-ACK feedback bit (or a HARQ-ACK codebook size) that the terminal has to transmit by downlink assignment indicator (DAI) information included in DCI in a slot in which HARQ-ACK information is transmitted according to a value of slot information K0 for mapping the PDSCH and a value of HARQ-ACK feedback timing information K1 for the PDSCH.

According to embodiments of the present disclosure, provided are a method and apparatus for configuring a HARQ-ACK codebook in a situation where a terminal performs one or more HARQ-ACK transmissions in one slot. Also, in the present disclosure, a method and apparatus for transmitting HARQ-ACK feedback for DL data transmission in a carrier aggregation (CA) environment will be described. In the 3GPP LTE Rel-10, a bandwidth extension technology is adopted to support a data transmission amount greater than that in the LTE Rel-8. The technology called bandwidth extension or CA may extend bands to increase the data transmission amount by the extended bands, compared to a LTE Rel-8 terminal that transmits data in one band. Each of the bands is referred to as a component carrier (CC), and the LTE Rel-8 terminal is defined to have one CC for each of a DL and a UL. Also, a DL CC and a UL CC connected to SIB-2 are collectively referred to as a cell. The SIB-2 connection relationship between the DL CC and the UL CC is transmitted as a system signal or a higher layer signal. A terminal that supports CA may receive DL data and transmit UL data through a plurality of serving cells.

In the Rel-10, a carrier indicator field (CIF) may be configured as a field notifying that, when it is difficult for a base station to transmit a physical downlink control channel (PDCCH) to a specific terminal in a specific serving cell, the PDCCH is transmitted in another serving cell and the corresponding PDCCH indicates a physical downlink shared channel (PDSCH) (or a DL data channel) or a physical uplink shared channel (PUSCH) (or a UL data channel) of another serving cell. The CIF may be configured for a terminal that supports CA. The CIF is determined to indicate another serving cell by adding 3 bits to PDCCH information in a specific serving cell. The CIF is included only when cross-carrier scheduling is performed. When the CIF is not included, cross-carrier scheduling is not performed. When the CIF is included in DL assignment information, the CIF may be defined to indicate a serving cell where a PDSCH scheduled by the DL assignment is to be transmitted. When the CIF is included in UL resource assignment information (UL grant), the CIF may be defined to indicate a serving cell where a PUSCH scheduled by the UL grant is to be transmitted.

As described above, in the LTE-10, the CA, which is the bandwidth extension technology, is defined, and a plurality of serving cells may be configured for the terminal. For data scheduling of the base station, the terminal may periodically or aperiodically transmit channel information for the serving cells to the base station. The base station may schedule and transmit data for each carrier, and the terminal may transmit ACK/NACK (A/N) feedback for data transmitted for each carrier. In the LTE Rel-10, it is designed so that the terminal transmits A/N feedback of up to 21 bits, and when A/N feedback overlaps transmission of channel information in one subframe, the A/N feedback is transmitted and the channel information is discarded. In the LTE Rel-11, it is designed so that the terminal multiplexes channel information of one cell with A/N feedback and transmits the A/N feedback of up to 22 bits and the channel information of one cell on transmission resources of PUCCH format 3.

On the other hand, in the LTE-13, a scenario for configuring up to 32 serving cells is assumed. A concept of extending the number of serving cells up to 32 by using licensed bands and unlicensed bands is being discussed. In this case, there is a risk that the transmissions of channel information for the serving cells in one subframe may collide with each other, and a new PUCCH format is being designed to transmit a plurality of pieces of channel information or A/N feedback at once. Accordingly, when channel information or A/N feedback for as many serving cells as possible in one subframe are multiplexed under various conditions, a method of supporting a terminal operation may be required. That is, there is a need for a method of determining the transmission operation and transmission resource of channel information to be transmitted by the terminal or A/N feedback to be transmitted by the terminal in a situation considering conditions, such as the number of serving cells configured for the terminal, the type of PUCCH format configured for the terminal, whether to perform simultaneous PUCCH and PUSCH transmission configured for the terminal, or PUCCH transmissions in another secondary cell other than a primary cell configured for the terminal, and transmitting the channel information and the A/N feedback alone or in combination by using a transmission format mapped to the transmission resource.

In the 5G NR, most of the operation functions of the CA are the same as the CA applied in the LTE, but there are different parts in terms of PUCCH transmission. For example, in the LTE, the PUCCH format is determined according to whether uplink control Information (UCI) to be transmitted on a PUCCH is SR, HARQ-ACK, channel state information (CSI), or combined information thereof, and in the NR, the PUCCH format is determined according to the number of UCI bits, regardless of SR, HARQ-ACK, or CSI. Specifically, the PUCCH format may be determined according to the time resource duration (the number of symbols) of the PUCCH and the number of UCI bits.

When CCs supported for CA are within the same frequency band or may exist in different frequency bands, there are three CA scenarios as follows.
 1. Intraband aggregation with frequency-contiguous component carriers
 2. Intraband aggregation with non-contiguous component carriers
 3. Interband aggregation with non-contiguous component carriers Although the structures according to the scenarios described above are all the same, the degree of RF complexity may vary according to individual scenarios. Unlike the LTE, the NR supports up to 16 carriers and supports different frequency bandwidth sizes and duplex modes. A maximum size of one carrier is about 400 MHz in the NR. Therefor, when the 16 carriers each have a size of about 400 MHz, a bandwidth size of up to 6.4 GHz may be theoretically supported through CA. A terminal that supports CA as in the LTE may support simultaneous reception or transmission for two or more carriers. In the third scenario among the scenarios described above, it may be possible to have different time division multiplex (TDD) configurations for each carrier. Because the frequency bands are different from each other, different carriers do not need to have the same transmission direction. Therefore, unlike a terminal that does not support CA, a terminal that supports CA may require a duplex filter so as to handle the situation described above. In the 3GPP standard, CA may be described by using the term "cell." Accordingly, a terminal that supports CA may transmit and receive information to and from multiple cells. One of these cells is referred to as a primary cell (PCell), which is a cell that the terminal initially searches for and connects. Thereafter, secondary cells (Scells) may be configured with a higher layer signal, and may be activated or deactivated by MAC CE or RRC. As an example, a bitmap of the MAC CE may indicate activation or deactivation of secondary cells configured with a higher layer signal. Also, the number of DL cells may be equal to or different from the number of UL cells. In other cases, in general, the number of DL cells may be greater than the number of UL cells.

According to embodiments of the present disclosure, a method, performed by a terminal, of transmitting a PUCCH in one slot in a CA situation and an apparatus therefor are disclosed.

TABLE 1

| Channel bandwidth ($BW_{Channel}$ [MHz]) | 1.4 | 3 | 5 | 10 | 15 | 20 |
|---|---|---|---|---|---|---|
| Transmission bandwidth configuration ($N_{RB}$) | 6 | 15 | 25 | 50 | 75 | 100 |

The 5G system or the NR system may operate in the channel bandwidth wider than the channel bandwidth of the LTE presented in Table 1. Table 2 shows a correspondence between a system transmission bandwidth, a channel bandwidth, and subcarrier spacing (SCS) in the 5G system or the NR system.

TABLE 2

| SCS | Channel bandwidth ($BW_{Channel}$ [MHz]) | | | | | | | | | |
|---|---|---|---|---|---|---|---|---|---|---|
| [kHz] | 5 | 10 | 15 | 20 | 25 | 40 | 50 | 60 | 80 | 100 |
| Maximum Transmission bandwidth ($N_{RB}$) | | | | | | | | | | |
| 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

FIG. 1 is a diagram illustrating a transmission structure of a time-frequency domain that is a radio resource domain in a 5G system or an NR system, according to an embodiment of the present disclosure.

Referring to FIG. 1, in the radio resource domain, the horizontal axis represents a time domain, and the vertical axis represents a frequency domain. A minimum transmission unit in the time domain is an OFDM symbol, and Nsymb OFDM symbols 102 are gathered to configure one slot 106. A length of a subframe may be defined as 1.0 ms, and a radio frame 114 may be defined as 10 ms. A minimum transmission unit in the frequency domain is a subcarrier, and an entire system transmission bandwidth may be configured with a total of NBW subcarriers 104. However, these specific numerical values may be variably applied depending on a system.

A basic unit of a time-frequency resource domain is a resource element (RE) 112, which may be represented by an OFDM symbol index and a subcarrier index. A resource block (RB) 108 or a physical resource block (PRB) may be defined as Nsymb consecutive OFDM symbols 102 in the time domain and NRB consecutive subcarriers 110 in the frequency domain. Therefore, one RB 108 may include Nsymb×NRB REs 112.

In general, a minimum transmission unit of data is an RB unit. In the 5G system or the NR system, it is general that Nsymb=14, NRB=12, and NBW and NRB may be proportional to a system transmission bandwidth. A data rate increases in proportion to the number of RBs scheduled for a terminal. In the 5G system or the NR system, in the case of a frequency division duplex (FDD) system operating while dividing a DL and a UL by frequency, a DL transmission bandwidth may be different from a UL transmission bandwidth. A channel bandwidth represents a radio frequency (RF) bandwidth corresponding to the system transmission bandwidth. Table 1 below shows a correspondence between a system transmission bandwidth and a channel bandwidth defined in an LTE system, which is a 4th generation wireless communication before the 5G system or the NR system. For example, the LTE system with a channel bandwidth of 10 MHz has a transmission bandwidth of 50 RBs.

In the 5G system or the NR system, scheduling information for DL data system or UL data is transmitted from the base station to the terminal through DCI. The DCI is defined according to various formats. Depending on the formats, the DCI may indicate whether the DCI is scheduling information (UL grant) for UL data or scheduling information (DL grant) for DL data, whether the DCI is a compact DCI with a small size of control information, whether to apply spatial multiplexing using multiple antennas, and whether the DCI is DCI for power control. For example, DCI format 1-1, which is scheduling control information (DL grant) for DL data, may include at least one piece of the following control information.

- Carrier indicator: may indicate a frequency carrier on which transmission is performed.
- DCI format indicator: may be an indicator that identifies whether the DCI is for DL or UL.
- Bandwidth part (BWP) indicator: may indicate a BWP in which transmission is performed.
- Frequency domain resource assignment: indicates an RB of a frequency domain allocated for data transmission. A resource to be represented may be determined according to the system bandwidth and resource allocation method.
- Time domain resource assignment: may indicate a slot and an OFDM symbol of the slot, on which a data-related channel is to be transmitted.
- VRB-to-PRB mapping: may indicate a method of mapping a virtual RB (VRB) index and a physical RB (PRB) index.
- Modulation and coding scheme (MCS): indicates a modulation scheme and a coding rate that are used for data transmission. That is, the MCS may indicate a coding rate value capable of notifying of channel coding information and a transport block size (TBS) together with information about whether the modulation scheme corresponds to quadrature phase shift keying (QPSK), 16 quadrature amplitude modulation (16QAM), 64QAM, or 256QAM.
- Codeblock group (CBG) transmission information: may indicate information about which CBG is transmitted when CBG retransmission is configured.

HARQ process number: indicates a process number of HARQ.

New data indicator: may indicate whether transmission is HARQ initial transmission or retransmission.

Redundancy version: may indicate a redundancy version of HARQ.

Transmit power control (TPC) command for PUCCH: may indicate a transmit power control command for PUCCH, which is an UL control channel.

In the case of PUSCH transmission, time domain resource assignment may be transmitted by information about the slot in which the PUSCH is transmitted, the start OFDM symbol position S in the corresponding slot, and the number L of OFDM symbols to which the PUSCH is mapped. S may be a relative position from the start of the slot, L may be the number of consecutive OFDM symbols, and S and L may be determined from a start and length indicator value (SLIV) defined as follows.

$$\begin{aligned} &\text{If } (L-1) \le 7 \text{ then} \\ &\quad SLIV = 14\cdot(L-1)+S \\ &\text{else} \\ &\quad SLIV = 14\cdot(14-L+1)+(14-1-S) \\ &\text{where } 0 < L \le 14-S \end{aligned}$$

The 5G system or the NR system may be configured with Table including information about an SLIV value, a PUSCH mapping type, and a slot in which a PUSCH is transmitted in one row through RRC configuration. Thereafter, in the time domain resource assignment of the DCI, the base station may indicate an index value in the configured table to transmit, to the UE, the information about the SLIV value, the PUSCH mapping type, and the slot in which the PUSCH is transmitted.

In the 5G system or the NR system, the PUSCH mapping type is defined as type A and type B. In the PUSCH mapping type A, the first OFDM symbol among demodulation reference signal (DMRS) OFDM symbols is located in the second or third OFDM symbol in the slot. In the PUSCH mapping type B, the first OFDM symbol among DMRS OFDM symbols is located in the first OFDM symbol on the time domain resource allocated for PUSCH transmission. The PUSCH time domain resource assignment method may be equally applicable to PDSCH time domain resource assignment.

The DCI may be transmitted on a PDCCH (hereinafter used interchangeably with DL control channel or control information) through a channel coding and modulation process.

In general, the DCI is independently scrambled by a specific radio network temporary identifier (RNTI) (or a UE identifier) for each terminal, so that cyclic redundancy check (CRC) is added thereto, and is channel-coding and is then transmitted by being configured as an independent PDCCH. The PDCCH is transmitted by being mapped in a control resource set (CORESET) configured for the terminal.

DL data may be transmitted on a PDSCH, which is a physical channel for DL data transmission. The PDSCH may be transmitted after a control channel transmission interval, and scheduling information such as a specific mapping position and a modulation scheme in the frequency domain is determined based on the DCI transmitted through the PDCCH.

The base station notifies the UE of the modulation scheme applied to the PDSCH to be transmitted and the size of data to be transmitted (hereinafter referred to as TBS) through the MCS among pieces of the control information constituting the DCI. In an embodiment, the MCS may include 5 bits, or more or fewer bits. The TBS corresponds to the size before the channel coding for error correction is applied to data (transport block (TB)) to be transmitted by the base station.

In the present disclosure, the TB may include a MAC header, a MAC CE, one or more MAC service data units (SDUs), and padding bits. Alternatively, the TB may indicate a MAC protocol data unit (PDU) or a data unit transmitted from a MAC layer to a physical layer.

The modulation scheme supported by the 5G system or the NR system is QPSK, 16QAM, 64QAM, and 256QAM, and each modulation order (Qm) corresponds to 2, 4, 6, and 8. 2 bits per symbol may be transmitted in QPSK modulation, 4 bits per OFDM symbol may be transmitted in 16QAM modulation, 6 bits per symbol may be transmitted in 64QAM modulation, and 8 bits per symbol may be transmitted in 256QAM modulation.

In the 5G system or the NR system, in a case where the terminal is scheduled for the PDSCH or the PUSCH by the DCI, when the time resource assignment field index m included in the DCI is indicated, this informs a combination of DMRS type A position information, PDSCH mapping type information, slot index K0, data resource start symbol S, and data resource assignment length L, which correspond to m+1 in Table indicating time domain resource assignment information. As an example, Table 1 is Table including pieces of time domain resource assignment information.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

PDSCH Time Domain Resource Assignment Based on Normal CP

In Table 3, dmrs-typeA-Position is a field indicating a symbol position at which a DMRS is transmitted in one slot indicated by a system information block (SIB), which is one of pieces of UE-common control information. The value of the field may be 2 or 3. When the number of symbols constituting one slot is 14 and the first symbol index is 0, 2 refers to the third symbol and 3 refers to the fourth symbol.

In Table 3, PDSCH mapping type is information indicating the position of the DMRS in the scheduled data resource domain. When PDSCH mapping type is A, the DMRS may be always transmitted and received at the symbol position determined in dmrs-typeA-Position, regardless of the allocated data time domain resources.

When PDSCH mapping type is B, the DMRS may be always transmitted and received in the first symbol among the allocated data time domain resources. In other words, PDSCH mapping type B does not use dmrs-typeA-Position information.

In Table 1, $K_0$ refers to an offset between a slot index to which the PDCCH on which the DCI is transmitted belongs and a slot index to which the PDSCH or PUSCH scheduled in the DCI belongs. For example, when the slot index of the PDCCH is n, the slot index of the PDSCH or PUSCH scheduled by the DCI of the PDCCH is $n+K_0$.

In Table 3, S refers to a start symbol index of the data time domain resource within one slot. The range of possible S values is usually 0 to 13 on a normal CP basis.

In Table 3, L refers to a data time domain resource interval length within one slot. The range of possible L values is 1 to 14. However, the possible S and L values are determined by Equation 1 and Table 5 or Table 6 below. Table 3 may be values used as default by the terminal before receiving time resource assignment information by UE-specific or UE-common higher layer signaling. As an example, DCI format 0_0 or 1_0 may always use Table 3 as default time resource domain values.

Table 3 shows PDSCH time domain resource assignment values. For PUSCH time domain resource assignment, K1 is used instead of K2. Table 4 below is an example of a PUSCH time domain resource assignment table.

TABLE 4

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |

TABLE 4-continued

| Row index | PUSCH mapping type | $K_2$ | S | L |
|---|---|---|---|---|
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

PDSCH Time Domain Resource Assignment Based on Normal CP

If $(L-1) \le 7$ then
$\quad SLIV = 14 \cdot (L-1)+S$
else
$\quad SLIV = 14 \cdot (14-L+1)+(14-1-S)$
where $0 < L \le 14-S$
... Equation 1

Table 5 below shows possible combinations of S and L according to whether the CP is a normal CP or an extended CP and whether the PDSCH mapping type is type A or type B.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs − TypeA − Position = 3

PDSCH Time Domain Resource Assignable Combination of S and L

Table 6 below shows possible combinations of S and L according to whether the CP is a normal CP or an extended CP and whether the PUSCH mapping type is type A or type B.

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 2} |

PUSCH Time Domain Resource Assignable Combination of S and L

In Table 3, each index may be set through a higher layer signaling parameter PDSCH-TimeDomainResourceAllocationList or PUSCH-TimeDomainResourceAllocationList.

PDSCH-TimeDomainResourceAllocationList includes one or more higher layer signaling parameters PDSCH-TimeDomainResourceAllocation, and PDSCH-TimeDomainResourceAllocation includes k0, mappingtype, and startSymbolAndLength. The possible value range of k0 is 0 to 32. Mappingtype may correspond to type A or type B. The possible value range of StartSymbolAndLength is 0 to 127. As described above, when mappingtype is type A, the symbol position of the DMRS follows a value indicated by dmrs-typeA-Position.

PUSCH-TimeDomainResourceAllocationList includes one or more higher layer signaling parameters PUSCH-TimeDomainResourceAllocation, and PUSCH-TimeDomainResourceAllocation includes k0, mapping type, and startSymbolAndLength. The possible value range of k0 is 0 to 32. Mappingtype may correspond to type A or type B. The possible value range of StartSymbolAndLength is 0 to 127. As described above, when mappingtype is type A, the symbol position of the DMRS follows a value indicated by dmrs-typeA-Position.

PDSCH-TimeDomainResourceAllocation or PUSCH-TimeDomainResource Allocation described above is a method of allocating PDSCH or PUSCH time domain resources within one slot. The higher layer signaling aggregationFactorDL may refer to the number of slots in which a PDSCH-TimeDomainResourceAllocation value applied to one slot is repeatedly transmitted.

The higher layer signaling aggregationFactorUL may refer to the number of slots in which a PUSCH-TimeDomainResourceAllocation value applied to one slot is repeatedly transmitted. The possible value range of aggregationFactorDL and aggregationFactorUL is {1, 2, 4, 8}. For example, when aggregationFactorDL is 8, it may mean that one value of possible PDSCH-TimeDomainResourceAllocations is repeatedly transmitted over a total of eight slots. However, when at least some symbols applied to PDSCH-TimeDomainResourceAllocation in a specific slot are UL symbols, PDSCH transmission and reception in the corresponding slot may be omitted. Similarly, when at least some symbols applied to PUSCH-TimeDomainResourceAllocation in a specific slot are DL symbols, PUSCH transmission and reception in the corresponding slot may be omitted.

Figure 2:
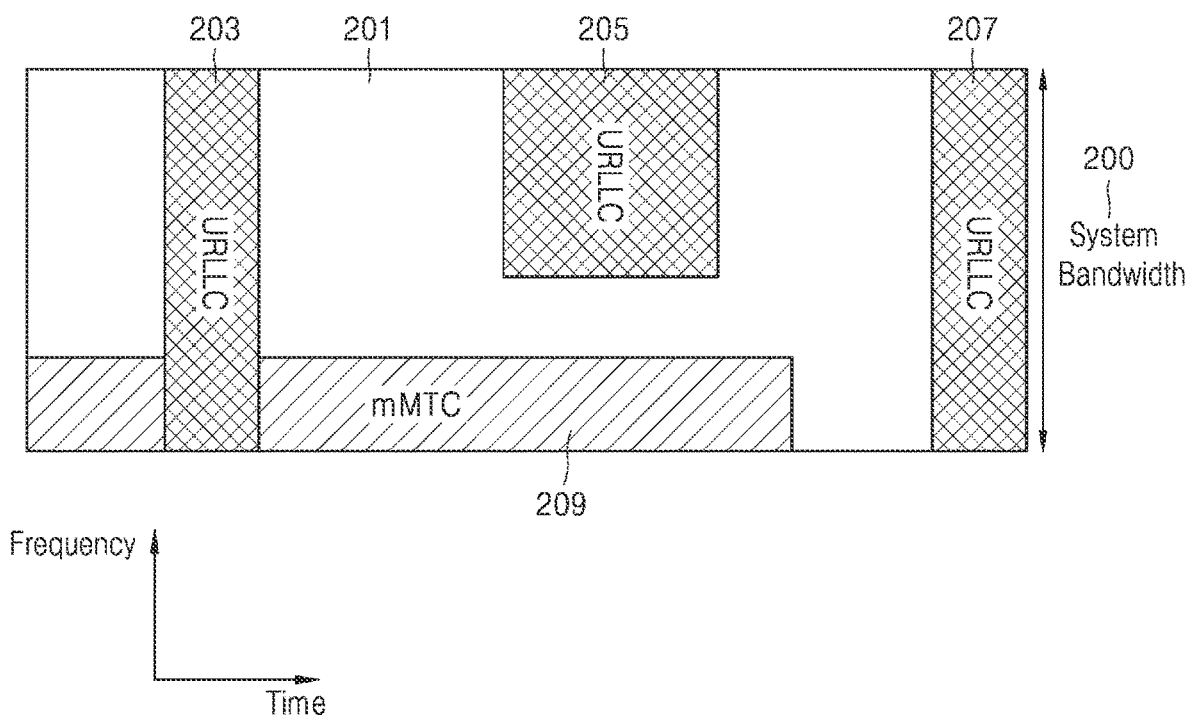
FIG. 2 is a diagram for describing a method of allocating enhanced mobile broadband (eMBB) data, ultra-reliable and low-latency communications (URLLC) data, and massive machine type communications (mMTC) data in a time-frequency resource domain in a 5G system or an NR system, according to an embodiment of the present disclosure.

FIG. 2 is a diagram for describing a method of allocating eMBB data, URLLC data, and mMTC data in a time-frequency resource domain in a 5G system or an NR system, according to an embodiment of the present disclosure.

Referring to FIG. 2, eMBB data, URLLC data, and mMTC data may be allocated to an entire system frequency band 200. When URLLC data 203, 205, and 207 are generated and required to be transmitted while eMBB 201 and mMTC 209 are allocated to a specific frequency band and transmitted, the URLLC data 203, 205, and 207 may be transmitted without emptying or transmitting a portion in which the eMBB 201 and the mMTC 209 have already been allocated.

Among the services described above, URLLC needs to reduce latency, the URLLC data may be allocated to a part of a resource to which the eMBB or the mMTC is allocated and may be transmitted.

When URLLC is additionally allocated and transmitted in the resource to which eMBB is allocated, eMBB data may not be transmitted in overlapping frequency-time resources. Accordingly, the transmission performance of eMBB data may be deteriorated. That is, an eMBB data transmission failure may occur due to URLLC allocation.

Figure 3:
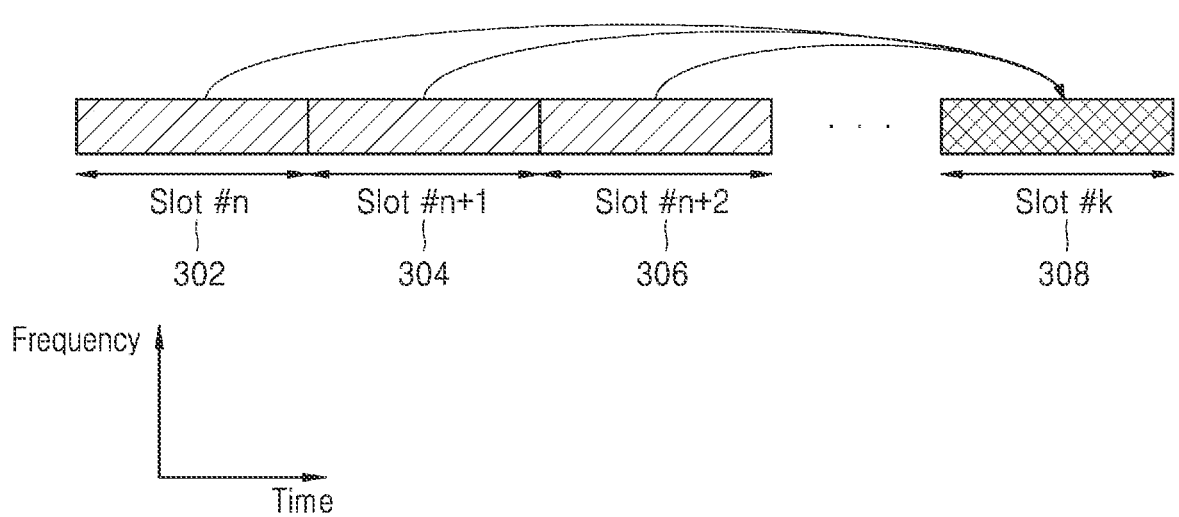
FIG. 3 is a diagram illustrating a method of configuring a semi-static hybrid automatic repeat request-acknowledgement (HARQ-ACK) codebook in an NR system, according to an embodiment of the present disclosure.

FIG. 3 is a diagram illustrating a method of configuring a semi-static HARQ-ACK codebook in an NR system.

In a situation where the number of HARQ-ACK PUCCHs transmittable by the terminal within one slot is limited to one, when the terminal receives a semi-static HARQ-ACK codebook configured by higher layer signaling, the terminal may report HARQ-ACK information for PDSCH reception or semi-persistent scheduling (SPS) PDSCH release in a HARQ-ACK codebook in a slot indicated by a value of a PDSCH-to-HARQ_feedback timing indicator in DCI format 1_0 or DCI format 1_1.

In a slot that is not indicated by a PDSCH-to-HARQ_feedback timing indicator field in DCI format 1_0 or DCI format 1_1, the terminal may report a HARQ-ACK information bit value in a HARQ-ACK codebook as NACK.

When the terminal reports only HARQ-ACK information for one SPS PDSCH release or one PDSCH reception in $M_{A,C}$ cases for reception of candidate PDSCHs and the report of the terminal is scheduled by DCI format 1_0 including information indicating that a counter DACI field is 1 in a Pcell, the terminal may determine one HARQ-ACK codebook for the SPS PDSCH release or the PDSCH reception.

Other than the above case, an HARQ-ACK codebook determination method according to methods to be described below is employed.

When a set of PDSCH reception candidate occasions in a serving cell c is $M_{A,C}$, $M_{A,C}$ may be obtained through the pseudo-code 1 stages below.

Start of pseudo-code 1
Stage 1: initializing j to 0, and initializing $M_{A,C}$ to an empty set. Initializing k, which is an HARQ-ACK transmission timing index, to 0.
Stage 2: configuring R as a set of rows of Table including information of a slot to which a PDSCH is mapped, start symbol information, and information of the number or length of symbols. When a PDSCH-available mapping symbol indicated by a value of R is configured for a UL symbol according to DL and UL configurations configured at a higher level, removing a corresponding row from R.
Stage 3-1: receiving, by the terminal, one unicast PDSCH in one slot, and when R is not an empty set, adding one unicast PDSCH to set $M_{A,C}$.
Stage 3-2: when the terminal is able to receive two or more unicast PDSCHs in one slot, counting the number of PDSCHs allocatable in different symbols from the calculated R, and adding the counted number of PDSCHs to $M_{A,C}$.
Stage 4: increasing k by 1 and restarting from Stage 2.
End of pseudo-code 1

Referring to FIG. 3, for pseudo-code 1, in order to perform HARQ-ACK PUCCH transmission at slot #k 308, all slot candidates available for PDSCH-to-HARQ-ACK timing capable of indicating slot #k 308 may be considered.

In FIG. 3, it is assumed that HARQ-ACK transmission is possible at slot #k 308 by a PDSCH-to-HARQ-ACK timing combination available only for PDSCHs scheduled at slot #n 302, slot #n+1 304, and slot #n+2 306. Considering time domain resource configuration information of PDSCH available for scheduling at each of slots 302, 304, and 306 and information indicating whether a symbol within a slot is for DL or UL, the number of PDSCHs available for maximum scheduling for each slot may be derived.

For example, when two PDSCHs in slot 302, three PDSCHs in slot 304, and two PDSCHs in slot 306 are available for maximum scheduling, the maximum number of PDSCHs included in the HARQ-ACK codebook transmitted at slot 308 is a total of seven. This is referred to as cardinality of the HARQ-ACK codebook.

Figure 4:
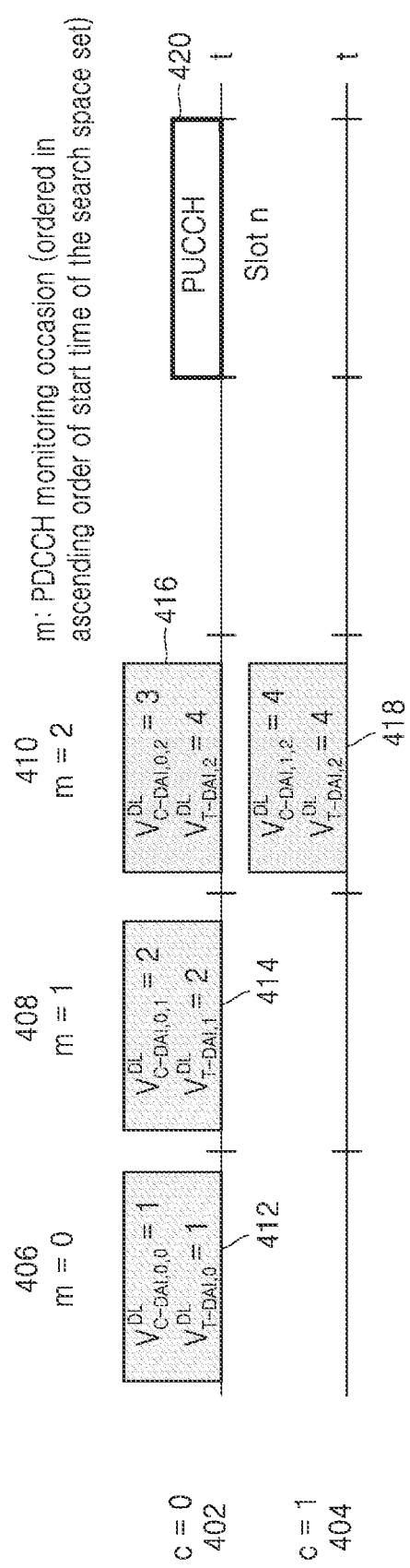
FIG. 4 is a diagram illustrating a method of configuring a dynamic HARQ-ACK codebook in an NR system, according to an embodiment of the present disclosure.

FIG. 4 is a diagram illustrating a method of configuring a dynamic HARQ-ACK codebook in an NR system.

Based on a PDSCH-to-HARQ_feedback timing value for PUCCH transmission of HARQ-ACK information at slot n for PDSCH reception or SPS PDSCH release, and K0 that is transmission slot position information of PDSCH for scheduling in DCI format 1_0 or 1_1, the terminal may transmit HARQ-ACK information that is transmitted within one PUCCH in slot n. Specifically, for the transmission of the HARQ-ACK information, the terminal may determine the HARQ-ACK codebook of PDCCH transmitted at the slot determined by K0 and PDSCH-to-HARQ_feedback timing, based on a DAI included in DCI indicating PDSCH or SPS PDSCH release.

The DAI includes a counter DAI and a total DAI. The counter DAI is information in which the HARQ-ACK information corresponding to a PDSCH scheduled in DCI format 1_0 or DCI format 1_1 indicates a position in the HARQ-ACK codebook. Specifically, a value of the counter DAI in DCI format 1_0 or DCI format 1_1 indicates a cumulative value of PDSCH reception or SPS PDSCH release scheduled by DCI format 1_0 or DCI format 1_1 in specific cell c. The cumulative value is set based on a serving cell and PDCCH monitoring occasion in which the scheduled DCI exists.

The total DAI is a value indicating the size of the HARQ-ACK codebook. Specifically, a value of the total DAI refers to the total number of PDSCH or SPS PDSCH releases, which are scheduled at and before the time point at which DCI is scheduled. The total DAI may be a parameter used when HARQ-ACK information in serving cell c also includes HARQ-ACK information about PDSCH scheduled in another cell including serving cell c in a CA situation. In other words, there may be no total DAI parameter in a system operating with one cell. Of course, the present disclosure is not limited to the above examples.

FIG. 4 illustrates an example of the operation for the DAI. FIG. 4 is a diagram illustrating that, in a situation where two carriers are configured for the terminal, when the terminal transmits, to a PUCCH 420, an HARQ-ACK codebook selected based on a DAI in an n-th slot of carrier 0 402, the values of a counter DAI (C-DAI) and a total DAI (T-DAI) indicated by DCI discovered in each PDCCH monitoring occasion configured for each carrier are changed.

First, in DCI discovered at m=0 (406), each of the C-DAI and the T-DAI indicates a value 412 of 1. In DCI discovered at m=1 (408), each of the C-DAI and the T-DAI indicates a value 414 of 2. In DCI discovered in carrier 0 (c=0, 402) of m=2 (410), the C-DAI indicates a value 416 of 3. In DCI discovered in carrier 1 (c=1, 404) of m=2 (410), the C-DAI indicates a value 418 of 4. When carriers 0 and 1 are scheduled in the same monitoring occasion, all the T-DAIs are indicated by 4.

Referring to FIGS. 3 and 4, the determination of the HARQ-ACK codebook may be an operation in a situation where only one PUCCH containing HARQ-ACK information is transmitted in one slot. This is referred to as mode 1. As an example of a method by which one PUCCH transmission resource is determined in one slot, when PDSCHs scheduled in different pieces of DCI are multiplexed into one HARQ-ACK codebook in the same slot and the HARQ-ACK codebook is transmitted, a PUCCH resource selected for HARQ-ACK transmission may be determined to be a PUCCH resource indicated by a PUCCH resource field indicated in DCI lastly scheduling a PDSCH. That is, a PUCCH resource indicated by a PUCCH resource field indicated in DCI scheduled before the DCI may be neglected.

In the following description, methods and apparatuses for determining a HARQ-ACK codebook in a situation where two or more PUCCHs containing HARQ-ACK information may be transmitted in one slot are defined. This is referred to as mode 2. The terminal may operate only mode 1 (only one HARQ-ACK PUCCH is transmitted in one slot) or may operate only mode 2 (one or more HARQ-ACK PUCCHs are transmitted in one slot). Alternatively, the terminal supporting both mode 1 and mode 2 may be configured so that the base station operates in only one mode by higher layer signaling, or implicitly operates in mode 1 and mode 2 by a DCI format, an RNTI, a particular field value of DCI, and scrambling. For example, a PDSCH scheduled by DCI format A and pieces of HARQ-ACK information associated with the PDSCH may be based on mode 1, and a PDSCH scheduled by DCI format B and pieces of HARQ-ACK information associated with the PDSCH may be based on mode 2. The descriptions of FIGS. 3 and 4 may refer to section 9.2 of the 3GPP standard TS38.213.

Figure 5:
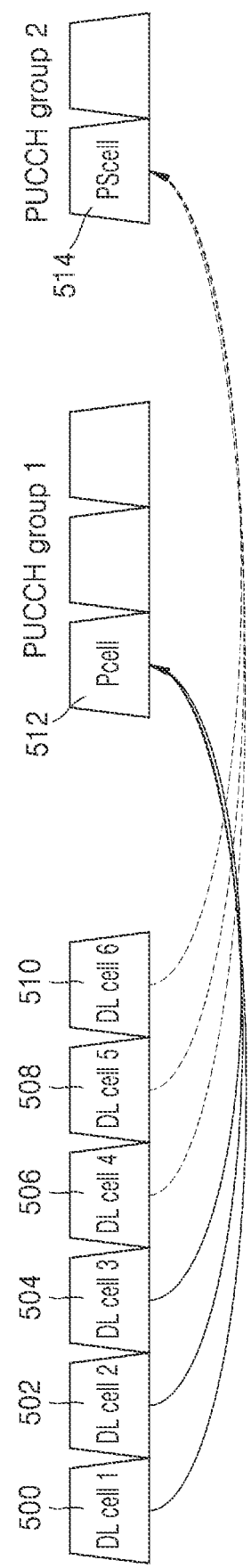
FIG. 5 is a diagram illustrating a concept of a physical uplink control channel (PUCCH) cell associated with a downlink cell in a carrier aggregation situation, according to an embodiment of the present disclosure.

FIG. 5 is a diagram illustrating a concept of a PUCCH cell associated with a DL cell in a CA situation, according to an embodiment of the present disclosure.

HARQ-ACK information may be basically used for a terminal to notify a base station of a demodulation/decoding result for a scheduled PDSCH. Basically, in the NR, all feedback (that is, UCI) including HARQ-ACK information may be transmitted to a primary cell. As described above, the number of cells in the DL and the number of cells in the UL may not always be equal to each other. Thus, this situation is determined considering this. Therefore, pieces of HARQ-ACK information for a great number of DL CCs may be transmitted and received through one UL carrier. For HARQ-ACK or other UCI information, when the number of DL CCs increases, the number of bits of UCI may increase. This may be burdensome for performing transmission by using only a single UL carrier. To compensate for this problem, two PUCCH groups are configured in the NR. The first group may transmit a PUCCH including UCI information to a PCell, and the second group may transmit a PUCCH including UCI information to a PScell. This is illustrated in FIG. 5. In PUCCH group 1, a Pcell 512 is a cell in which PUCCH transmission and reception for DL cells 500, 502, and 504 are performed. In PUCCH group 2, a PScell 514 is a cell in which PUCCH transmission and reception for DL cells 506, 508, and 510 are performed. For a detailed method of generating PUCCH groups, see section 6.3.2 of the 3GPP standard TS38.331, and for a method of transmitting and receiving PUCCH information according to the PUCCH group, see section 9 of the 3GPP standard TS38.213.

Embodiments to be described below solve problems that may occur between carriers existing in one PUCCH group or the same PUCCH group. URLLC is a service that requires high reliability and low latency as described above, and it is an important factor to minimize unnecessary latency between the base station and the terminal. In a situation where pieces of TDD configuration information of carrier-aggregated cells are different from each other, the base station allocates resources for transmitting a PUCCH for DL CCs associated with the same PUCCH group, considering configuration information of a slot format indicator (SFI) of the Pcell. That is, the PUCCH may not be transmitted for symbols indicated in DL by a higher layer signal or an L1 signal in the Pcell. Accordingly, there is a possibility that the transmission delay time of the PUCCH will be increased. In the following embodiments, methods capable of minimizing the delay time will be discussed.

Figure 6:
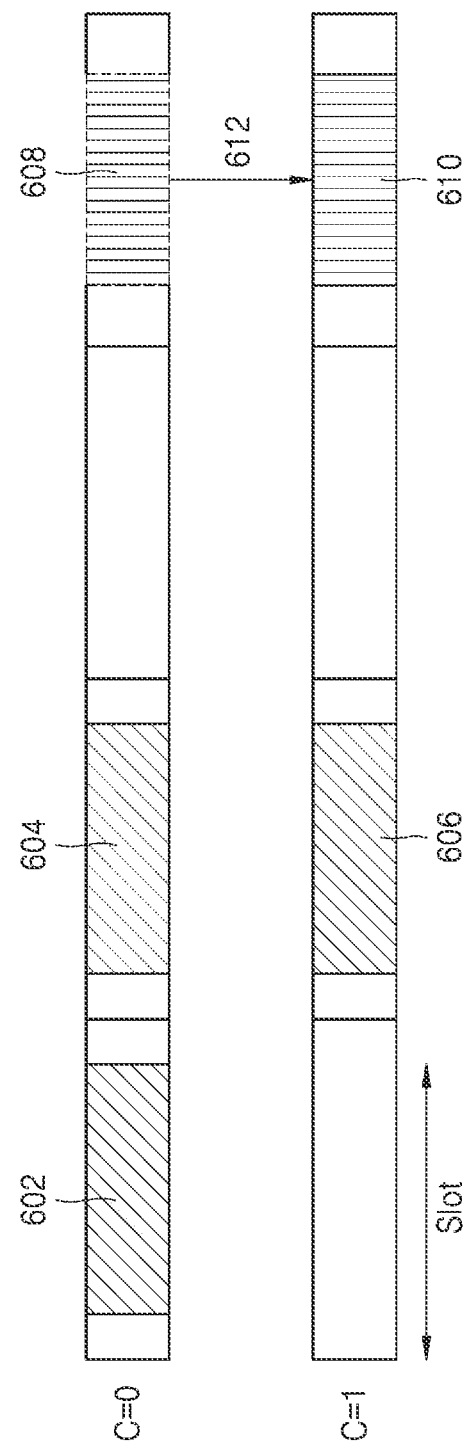
FIG. 6 is a diagram illustrating a method of transmitting HARQ-ACK information in a situation where carrier-aggregated carriers have different time division duplex (TDD) structures from each other, according to an embodiment of the present disclosure.

FIG. 6 is a diagram illustrating a method of transmitting HARQ-ACK information in a situation where carrier-aggregated carriers have different TDD structures from each other, according to an embodiment of the present disclosure.

FIG. 6 illustrates a situation where two carriers are carrier-aggregated. A Pcell is a cell having a cell index of 0 (c=0), and a cell index of 1 (c=1) is a secondary cell. Because the two carriers are all TDD, the number of UL cells and the number of DL cells may be all two. In the example of FIG. 6, the DL cell index and the UL cell index are regarded as the same, but may have different values from each other. For example, a DL cell index of 3 may be associated with a UL primary cell. Also, it may be possible to set TDD configuration information for the cell of c=0 and the cell of c=1 to have different directions by SFI. In FIG. 6, the base station schedules two PDSCHs 602 and 604 in a cell of c=0 by DCI, and the resource for transmitting a PUCCH 608 including HARQ-ACK information for the corresponding PDSCH is determined by PDSCH-to-HARQ-ACK timing information of the DCI and a PUCCH resource indicator field. Also, a PUCCH including HARQ-ACK information for a PDSCH 606 scheduled at c=1 may also be transmitted at 608. Therefore, the HARQ-ACK information included in the PUCCH 608 includes demodulation/decoding results for the PDSCHs 602 and 604 of c=0 and the PDSCH 606 of c=1, and the terminal may transmit the PUCCH including the HARQ-ACK information to the base station through the PUCCH 608 of the primary cell (c=0). However, when some resources of the PUCCH 608 are indicated as a DL symbol by a higher layer signal or an L1 signal, the terminal may not transmit the PUCCH 608, may regard this as an error case, and may perform an arbitrary operation. Therefore, the base station may have to ensure that all symbols on which the PUCCH 608 is transmitted are UL symbols so that the above situation does not occur. In the TDD structure, because there is usually a lot of DL traffic, the proportion of DL symbols is higher than the proportion of UL symbols. Therefore, the base station may transmit the PUCCH 608 to the UL symbol that first exists as long as the terminal described in section 5.3 of the TS 38.214 of the 3GPP standard satisfies the minimum processing time required for transmitting HARQ-ACK information for the PDSCH However, as described with reference to FIG. 6, when some resources of the PUCCH 608 are indicated as DL symbols, the corresponding PUCCH may be scheduled with a delay in slots existing as UL symbols. However, as described above, in URLLC, the HARQ-ACK transmission delay may cause the delay in the retransmission of the PDSCH and thus increase the delay time for overall data transmission and reception. Therefore, when the resources of the PUCCH 608 may be included in the same slot in the secondary cell other than the primary cell, it may be reasonable to transmit the PUCCH to the secondary cell other than the primary cell in terms of reducing the delay time. For example, by regarding the PUCCH 608 of c=0 as the PUCCH 610 of c=1 through an explicit or implicit change scheme 612, the terminal may transmit the corresponding PUCCH 610 at c=1. At this time, the PUCCH 608 and the PUCCH 610 include the same UCI information, and the PUCCH resource information may be explicitly or implicitly changed for the same or changed cell, regardless of the cell index. In the same case, the terminal may perform the same PUCCH transmission based on the lowest RB index based on the activated BWP, regardless of the frequency bandwidth size for both c=0 and c=1. In another case, for example, when the frequency band of c=0 is 100 MHz and the frequency band of c=1 is 10 MHz, frequency resource allocation information, frequency hopping information, PUCCH power allocation information, and the like may be changed. Before supporting the changed information, the base station may previously provide, to the terminal, the PUCCH-related configuration information described in section 6.3.2 of the 3GPP standard TS 38.331 for each cell, and the terminal may be applied considering the higher-level information for the changed cells. In this case, a separate additional DCI field or L1 signal may not be required. Alternatively, a combination of two methods may be applied. For example, when different pieces of PUCCH configuration information for each cell are not configured through a higher layer signal, the terminal may regard the PUCCH configuration information for each cell as being the same and follow the above-described method. On the other hand, when different pieces of PUCCH configuration information for each cell are configured through a higher layer signal, the terminal performs PUCCH transmission considering PUCCH higher layer signal configuration information related to the cell according to the changed cell index.

In the existing Rel-15 NR, indicating the PUCCH resource by another DCI in the resource indicated by the DL symbol is regarded as an error case. However, when the carrier aggregation described above with reference to FIG. 6 and the respective carriers have different TDD configuration information, the error case may no longer be an error case. There are two methods of supporting 612 in FIG. 6.

Method 6-1: Implicit method (change of cell index to transmit PUCCH by specific method)

The implicit method may be a method of transmitting PUCCH information for valid UL symbols based on slot format information previously set for each cell without a separate L1 signaling indication. Basically, when the PUCCH resource finally indicated by DCI is valid in the primary cell, the terminal may transmit the PUCCH resource in the primary cell. On the other hand, when the PUCCH resource finally indicated by DCI is not valid in the primary cell, the terminal may transmit the PUCCH resource in the earliest secondary cell among secondary cells in which PUCCH resource transmission is valid in the sequences determined by at least one of the following detailed methods. "Valid" means that at least some symbols of the indicated PUCCH resource are not configured or indicated as the DL symbol. "Not valid" means that at least some symbols of the indicated PUCCH resource are configured or indicated as the DL symbol. The cell index may be a cell index from a logical channel point of view or a cell index from a physical channel point of view.

Detailed method 6-1-1: When the primary cell index is c=i, a cell to transmit the PUCCH may be determined in ascending order (c=0→1→2→ . . . ) or in descending order (c=k→k−1→k−2→ . . . ) of the remaining cell indices other than c=i among the secondary cells. Here, k may be the total number of cells in which the PUCCH may be transmitted in the CA situation, the total number of UL transmission cells, or a value set by the base station configuration. According to the detailed method, when 0, 5, and 6 of the secondary cells are valid for PUCCH resource transmission, the PUCCH may be transmitted and received in the secondary cell corresponding to c=0 in the case of the ascending order and in the case of the descending order.

Detailed method 6-1-2: When the primary cell index is c=i, it is the ascending or descending order of the remaining cell indices other than c=i among the secondary cell. The difference from the detailed method 6-1-1 is that the ascending or descending order is determined based on the primary cell index. For example, the ascending order is determined in the order of primary cell (c=i)→c=mod(i+1, k)→c=mod(i+2, k)→c=mod(i+3, k)→ . . . . For example, the descending order is determined in the order of primary cell (c=i) →c=mod(i−1, k)→c=mod(i−2, k)→c=mod(i−3, k)→ . . . . According to the detailed method described above, when 0, 5, and 6 of the secondary cells are valid for PUCCH resource transmission and i=4, the PUCCH is transmitted and received in the secondary cell corresponding to c=5 in the case of the ascending order and c=0 in the case of the descending order.

According to method 6-1, the terminal may implicitly select the cell to transmit the PUCCH. When both the primary cell and the secondary cell in one PUCCH group are not valid cells capable of transmitting the PUCCH resource, the terminal may regard this as an error case and perform an arbitrary operation.

Method 6-2: Explicit method (selection of PUCCH transmission cell index)

The explicit method is a method of explicitly indicating a cell index in which a PUCCH including UCI information is to be transmitted by a DCI field or L1 signaling similarly to cross-carrier scheduling in which a cell in which a PDCCH is transmitted and received is different from a cell in which a PDSCH/PUSCH is transmitted and received. The following detailed methods may be considered, and at least one of them may be used.

Detailed method 6-2-1: An additional DCI field may be included like a CIF. At this time, when the bit field is n bits, the terminal may indicate a total of 2n cell indices. In this case, each value may inform the base station which UL cell index is associated for each value as a higher layer signal in advance. In this case, the first value may always be the primary cell.

Detailed method 6-2-2: The PUCCH resource indicator value, which is the field of DCI indicating the PUCCH resource, may also include information associated with a specific cell index as a higher layer signal in advance. When the corresponding higher layer signal value is not configured, the terminal may determine that it is PUCCH resource information associated with the primary cell. Specifically, in PUCCH resource indicator information, the PUCCH format, time/frequency resource information, hopping information, and the like are included in the higher layer signal configuration information (see section 6.3.2 of the TS 38.331 of the 3GPP standard). In addition to the higher layer signal configuration information, cell index information for transmitting the PUCCH is also included.

Detailed method 6-2-3: It is possible to be associated with CORESET or search space index. Specifically, a cell index in which PUCCH information for DCI detected in higher layer signal configuration information about CORESET or search space is transmitted may be set in advance. When the higher layer signal configuration information is not included in the higher layer signal relating to CORESET or search space in advance, the terminal determines that PUCCH information is transmitted in the primary cell.

Detailed method 6-2-4: RNTI or other RRC configuration information (sub-slot configuration, HARQ-ACK codebook index, processing time). In the case of RNTI, in the case of RNTI A, and the case of the primary cell and RNTI B, the terminal may interpret that PUCCH information is transmitted from one of the secondary cells previously set as a higher layer signal. Also, a cell index through which PUCCH information may be transmitted may be determined according to a sub-slot configuration that is an RRC parameter that the PDSCH-to-HARQ-ACK feedback timing indicates in a sub-slot unit less than 14 symbols rather than a slot. Similarly, a cell index to transmit PUCCH information may be determined according to the HARQ-ACK codebook index value or processing time capability determined by the higher layer signal or the L1 signal.

Figure 7:
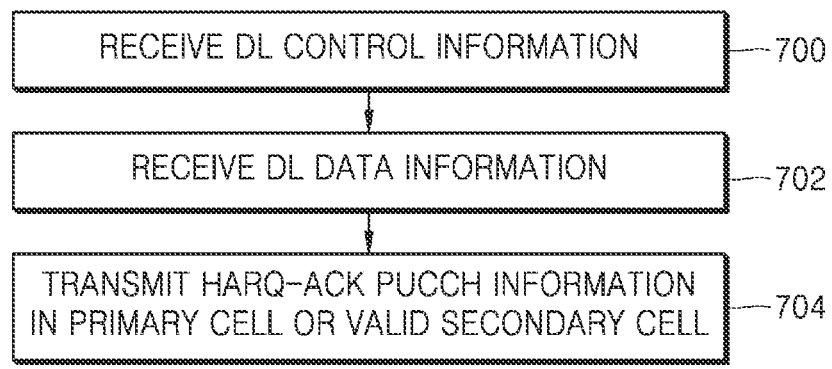
FIG. 7 is a block diagram illustrating a terminal operation of transmitting HARQ-ACK information in a situation where carrier-aggregated carriers have different TDD structures from each other, according to an embodiment of the present disclosure.

FIG. 7 is a block diagram illustrating a terminal operation of transmitting HARQ-ACK information in a situation where carrier-aggregated carriers have different TDD structures from each other, according to an embodiment of the present disclosure.

As described with reference to FIG. 6, when the terminal supports and is configured with CA in operation 700, the terminal may receive, from the base station, DL control information on a DL control channel configured from one cell or a plurality of cells. In operation 702, the terminal may receive DL data information in self-carrier scheduling or cross-carrier scheduling according to information indicated by the DL control information. The self-carrier scheduling is a scheduling method by which DL control information and data information are transmitted and received in the same cell, and the cross-carrier scheduling is a scheduling method by which DL control information and data information are transmitted and received in different cells. The terminal may transmit a PUCCH including HARQ-ACK information to the base station in a specific cell with respect to the reception of the DL data information. In operation 704, the terminal may transmit a PUCCH including HARQ-ACK information to the base station in a primary cell or a valid secondary cell by at least one of the methods described above with reference to FIG. 6.

Figure 8:
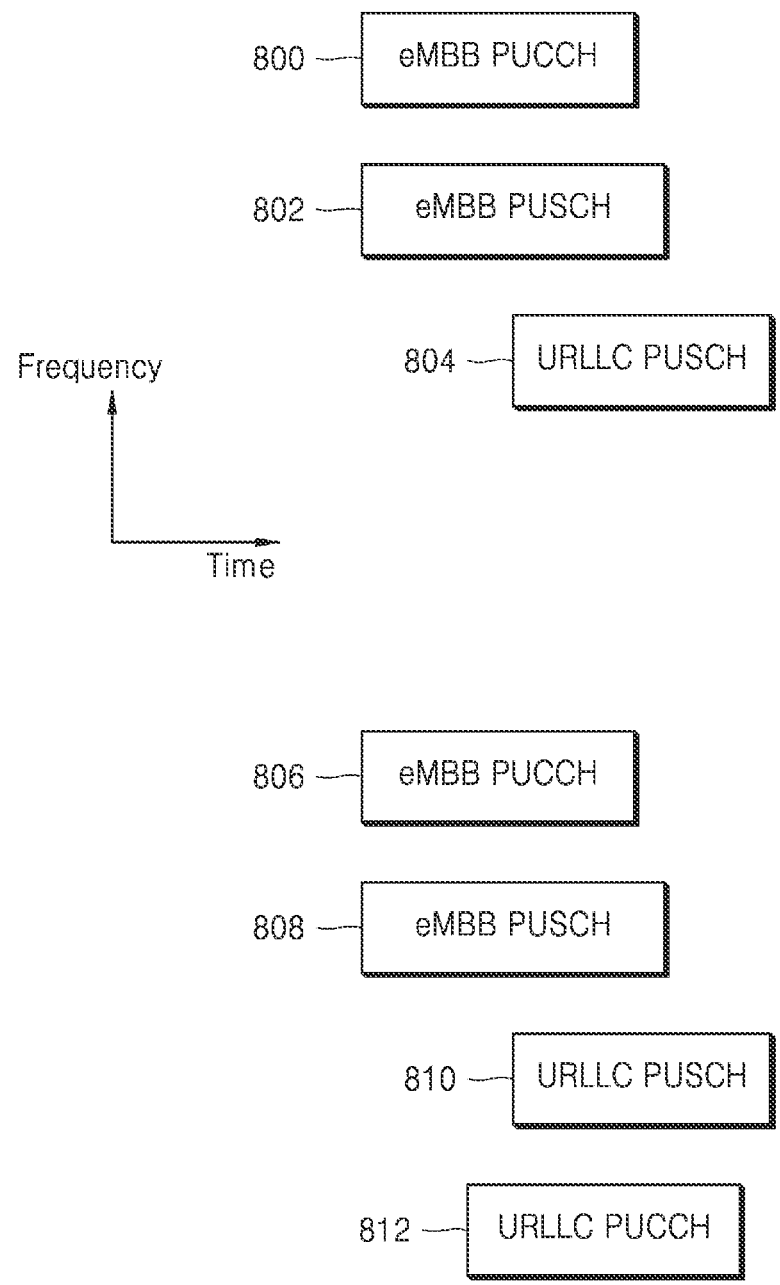
FIG. 8 illustrates a situation where an uplink control channel and a data channel having different priorities from each other overlap on time resources in one cell, according to an embodiment of the present disclosure.

FIG. 8 illustrates a situation where a UL control channel and a data channel having different priorities from each other overlap in one cell in terms of time resources, according to an embodiment of the present disclosure.

In FIG. 8, when the terminal reports the UE capability for simultaneous PUCCH and PUSCH transmission in one cell and the base station configures simultaneous PUCCH and PUSCH transmission for the terminal, the terminal may simultaneously transmit a PUCCH and a PUSCH. Also, the priorities of the PUCCH and the PUSCH may be determined according to a higher layer signal or an L1 signal. For example, whether the PUCCH is a PUCCH having a high priority (e.g., URLLC PUCCH) or a PUCCH having a low priority (e.g., eMBB PUCCH) may be determined according to DCI field information, RNTI, DCI format information, and DCI-detected CORESET/search space in the L1 signal. Also, whether the PUSCH is a PUSCH having a high priority (e.g., URLLC PUSCH) or a PUSCH having a low priority (e.g., eMBB PUSCH) may be determined. In FIG. 8, the priorities are expressed in two levels, but may be sufficiently applied even to the case of more than two levels. As illustrated in FIG. 8, an eMBB PUCCH 800, an eMBB PUSCH 802, and a URLLC PUSCH 804 may be scheduled by base station scheduling. Basically, when multiplexing is possible only for a PUCCH and a PUSCH having the same priority, the terminal will transmit UCI (hereinafter used interchangeably with UL control information) included in the eMBB PUCCH by including the UCI in the eMBB PUSCH 802. However, because the terminal does not support simultaneous transmission of the eMBB PUSCH and the URLLC PUSCH, the terminal should not include UCI information included in the eMBB PUCCH in the eMBB PUSCH. Therefore, the terminal drops the eMBB PUSCH 802 and performs simultaneous transmission of the eMBB PUCCH 800 and the URLLC PUSCH 804.

Alternatively, when the terminal is able to simultaneously transmit the PUSCH and the PUCCH in one cell, the terminal may determine whether PUSCHs and PUCCHs among all PUSCHs and PUCCHs received from the base station overlap each other in terms of time resources. For example, FIG. 8 illustrates a situation where the eMBB PUCCH 806, the eMBB PUSCH 808, the URLLC PUSCH 810, and the URLLC PUCCH 812 overlap within at least one symbol from a time resource point of view. In such a situation, the terminal may support at least one of the following two methods.

Method 8-1: A method of finally transmitting only one PUSCH and PUCCH after performing a drop operation according to priority for each PUSCH/PUCCH may be considered. When the overlapping situation as illustrated in FIG. 8 occurs, the terminal may drop the eMBB PUCCH 806 and transmit the URLLC PUCCH 812 from a PUCCH point of view, and may drop the eMBB PUSCH 808 and transmit the URLLC PUSCH 810 from a PUSCH point of view. The advantage of method 8-1 is that the terminal does not need to additionally consider whether PUSCH and PUCCH are multiplexed.

Method 8-2: In method 8-1, eMBB PUCCH is dropped. When HARQ-ACK feedback information is included in eMBB PUCCH information, retransmission of all PDSCHs related to HARQ-ACK information has to be performed from a base station point of view. In order to solve this problem, a method of supporting multiplexing for a PUCCH/PUSCH with a high priority and separately transmitting a PUCCH with a low priority may be considered. In FIG. 8, UCI information included in the URLLC PUCCH is transmitted by being included in the URLLC PUSCH, and the eMBB PUCCH is transmitted. Because the eMBB PUSCH has a lower priority than the URLLC PUSCH, the eMBB PUSCH is dropped. Therefore, method 8-2 has an advantage in that the number of channels to be dropped is reduced, compared to method 8-1.

Method 8-3: Method 8-3 is similar to method 8-1, but eMBB PUCCH may be transmitted to another cell. Similar to the method described above with reference to FIG. 6, the eMBB PUCCH may not be transmitted in the situation of FIG. 8. Therefore, when the terminal supports CA, the eMBB PUCCH is transmitted in a secondary cell other than a primary cell.

The PUCCH/PUSCH described above with reference to FIG. 8 may be a resource scheduled by DCI or may be resources configured through a higher layer signal in advance.

Figure 9:
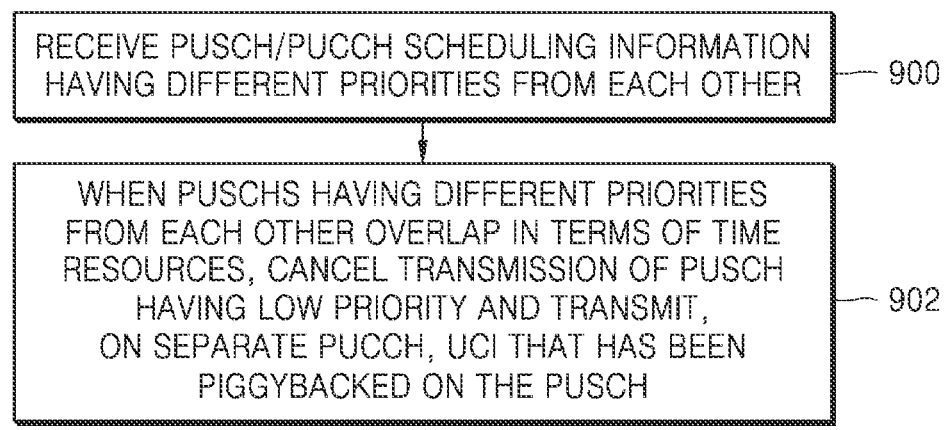
FIG. 9 is a block diagram illustrating a terminal operation when an uplink control channel and a data channel having different priorities from each other overlap on time resources in one cell, according to an embodiment of the present disclosure.

FIG. 9 is a block diagram illustrating a terminal operation when a UL control channel and a data channel having different priorities from each other overlap in one cell in terms of time resources, according to an embodiment of the present disclosure.

In operation 900, a terminal may receive PUSCH/PUCCH scheduling information having different priorities from each other. In operation 902, when PUSCHs having different priorities from each other overlap in terms of time resources, transmission of a PUSCH having a low priority may be canceled and UCI that has been piggybacked on the PUSCH may be transmitted on a separate PUCCH. Alternatively, by one of the methods described above with reference to FIG. 8, the terminal may drop some PUCCHs or PUSCHs through a drop or multiplexing scheme for PUCCHs or PUSCHs having different priorities from each other, and the terminal may transmit, to the base station, other PUCCHs or PUSCHs that are not dropped.

In the 5G NR, repeated transmission may be included, and one PUSCH or PUCCH may have a priority index value of 0 or 1. When the priority index value is not provided to one PUSCH or one PUCCH, the priority index may be 0. Of course, the present disclosure is not limited to the above examples. When one terminal monitors the PDCCH for one of DCI format 0_1/DCI format 1_1 or DCI format 0_2/DCI format 1_2 within one activated DL BWP, the priority index value may be provided through the "priority indicator field" in the DCI format. When one terminal reports the terminal performance capable of monitoring the PDCCH for both DCI format 0_1/DCI format 1_1 and DCI format 0_2/DCI format 1_2 within one activated DL BWP and receives the higher signal configuration therefor from the base station, DCI format 0_1 or DCI format 0_2 may schedule PUSCH transmission having a certain priority index, and DCI format 1_1 or DCI format 1_2 may schedule PDSCH reception and indicate PUCCH transmission including HARQ-ACK information having a certain priority index therefor.

When the terminal monitors DCI format 0_1 and DCI format 0_2 in the PDCCH within one activated BWP, the priority index value of the PUSCH scheduled in DCI format 0_1 by the higher layer signal may be set to 0 or 1, and the priority index value of the PUSCH scheduled in DCI format 0_2 may be set to 1 or 0. Alternatively, the priority index value of the PUSCH scheduled in DCI format 0_1 and the priority index value of the PUSCH scheduled in DCI format 0_2 may be always defined as 0 and 1 in the standard, respectively. When the terminal monitors DCI format 0_1 and DCI format 0_2 on the PDCCH within one activated BWP, it is not expected that higher layer configuration information is provided so that DCI format 0_1 and DCI format 0_2 have the same priority index value.

When the terminal monitors DCI format 1_1 and DCI format 1_2 in the PDCCH within one activated BWP, the priority index value of the PDSCH scheduled in DCI format 1_1 by the higher layer signal and the PUCCH including HARQ-ACK information therefor may be set to 0 or 1, and the priority index value of the PDSCH scheduled in DCI format 1_2 and the PUCCH including HARQ-ACK information therefor may be set to 1 or 0. Alternatively, the priority index values of the PDSCH scheduled in DCI format 1_1 and the PUCCH including HARQ-ACK information therefor and the priority index values of the PDSCH scheduled in DCI format 1_2 and the PUCCH including HARQ-ACK information therefor may be always defined as 0 and 1, respectively. When the terminal monitors DCI format 1_1 and DCI format 1_2 on the PDCCH within one activated BWP, it may not be expected that higher layer configuration information is provided so that DCI format 1_1 and DCI format 1_2 have the same priority index value.

After the terminal resolves the overlap between a plurality of PUCCH or PUSCH transmissions having the same priority index, the terminal transmits the first PUCCH having a high priority index value and the second PUCCH or the PUSCH having a small priority index value. When the transmission of the first PUCCH overlaps the transmission of the PUSCH or the second PUCCH in terms of time resources, the terminal does not transmit the PUSCH or the second PUCCH.

Alternatively, after the terminal resolves the overlap between a plurality of PUCCH or PUSCH transmissions having the same priority index, the terminal does not transmit the PUCCH when the transmissions of the PUSCH having a high priority index value, the PUCCH having a small priority index value, and the PUCCH overlap the transmission of the PUCCH in terms of time resources.

Alternatively, after the terminal resolves the overlap between a plurality of PUCCH or PUSCH transmissions having the same priority index, the terminal does not transmit the second PUSCH when the transmissions of the first PUSCH having a high priority index value in the same serving cell and the first PUSCH overlap the transmission of the second PUCCH in terms of time resources. At least one of the first PUSCH and the second PUSCH may be a PUSCH that is not scheduled by the DCI format, or both the first PUSCH and the second PUSCH are PUSCHs that are scheduled by the DCI format.

Figure 10:
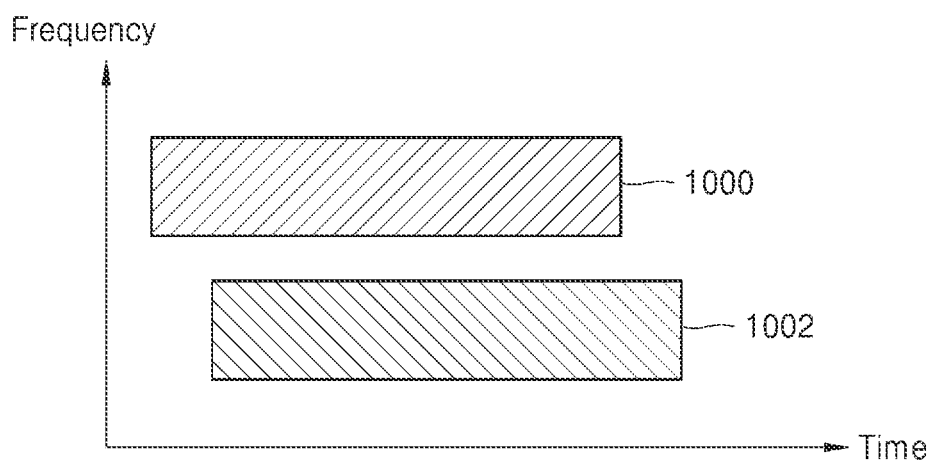
FIG. 10 illustrates a situation where two PUCCH resources are allocated, according to an embodiment of the present disclosure.

FIG. 10 illustrates a situation where two PUCCH resources are allocated, according to an embodiment of the present disclosure.

In FIG. 10, each of a first PUCCH 1000 and a second PUCCH 1002 may be a PUCCH scheduled by a DCI format, or may be a PUCCH scheduled without a separate DCI format. As described above, the PUCCHs 1000 and 1002 may correspond to priority index values thereof. That is, the PUCCHs may respectively have priority index values, and pieces of UL control information included in each of the PUCCHs may also correspond to PUCCH priority index values thereof. According to an embodiment of the present disclosure, the priority may be determined by a service type. For example, the priority may be determined according to a service type, such as eMBB or URLLC. Also, the priority index value may be a value indicating the priority.

According to an embodiment of the present disclosure, when the two PUCCHs 1000 and 10002 of FIG. 10 have the same priority index value, UCI of the first PUCCH 1000 and UCI included in the second PUCCH 1002 may overlap each other, may be multiplexed into one PUCCH resource, and may be transmitted by the terminal. When the priority index values are different from each other, the terminal may transmit a PUCCH having a high priority index value and may not transmit a PUCCH having a low priority index value. When the terminal reports, to the base station, the capability to simultaneously transmit a PUCCH and a PUSCH in one serving cell and the base station configures this through a higher layer signal in advance, the terminal may transmit all pieces of UCI of PUCCHs having different priority index values by at least one of two methods.

Method 10-1: The terminal may perform simultaneous transmission of the first PUCCH 1000 and the second PUCCH 1002. The terminal is configured with the simultaneous PUCCH and PUSCH transmission in one serving cell. Therefore, when the first PUCCH 1000 and the second PUCCH 1002 have different priority index values, the terminal may perform simultaneous transmission of the first PUCCH 1000 and the second PUCCH 1002. On the other hand, when the first PUCCH 1000 and the second PUCCH 1002 have the same priority index value, the terminal may multiplex the pieces of UCI included in the PUCCHs 1000 and 10002 and transmit the multiplexed UCI on one PUCCH. In summary, when PUCCHs having the same priority index value overlap in terms of time resources, the terminal multiplexes and schedules the PUCCHs on one PUCCH. Thereafter, when PUCCHs having different priority index values overlap, the terminal performs simultaneous transmission.

Method 10-2: A method of scheduling a PUSCH instead of a PUCCH may be considered. In method 10-2, the terminal is unable to perform simultaneous transmission of the first PUCCH 1000 and the second PUCCH 1002 in one cell, as in method 10-1. However, simultaneous transmission of the PUCCH and the PUSCH in one cell may be applicable in a possible situation. As an example, when the UE is indicated to report semi-persistent or aperiodic CSI in a UL DCI format, the terminal may transmit this on the PUSCH although this is UCI information. On the other hand, the terminal scheduled for a PDSCH in a DL DCI format may transmit HARQ-ACK information on a PUCCH. According to an embodiment of the present disclosure, UL DCI may refer to DCI including UL scheduling information, and DL DCI may refer to DCI including DL scheduling information.

Therefore, in a case where simultaneous PUCCH and PUSCH transmission in one cell is configured from the base station in advance through a higher layer signal, even though the priority index value of the CSI information included in the PUSCH is different from the priority index value of the HARQ-ACK information included in the PUCCH, the terminal may transmit both the PUSCH and the PUCCH even when overlapping in terms of time resources However, when PUCCH resources including HARQ-ACK information for PDSCHs scheduled in different DL DCI formats overlap in terms of time resources, the terminal may not be able to transmit the PUCCH including HARQ-ACK information with a small priority index value. Therefore, there may be a need for a method of transmitting HARQ-ACK information for the PDSCH scheduled in the DL DCI format on the PUSCH instead of the PUCCH.

For example, by adding a new DCI field for determining whether to transmit HARQ-ACK information on the PUCCH or the PUSCH in the DL DCI format, the terminal may be indicated to transmit HARQ-ACK information for the PDSCH on the PUSCH instead of the PUCCH. The new DCI field may have a bit value of 1 or 2 or more. When the new DCI field transmits HARQ-ACK information on the PUCCH, a PUCCH resource indicator (PRI) field may be determined as information to transmit PUCCH resource information. When the new DCI field transmits HARQ-ACK information on the PUSCH, time and frequency resource information in the PRI field may be determined as a resource for transmitting the PUSCH. Additionally, frequency hopping, HARQ process ID, NDI, MCS, RV information and values for the PUSCH may follow information previously configured through a higher layer signal. In this manner, the base station may receive HARQ-ACK information for the PDSCH scheduled in the DL DCI format from the terminal on the PUCCH or the PUSCH. Of course, the present disclosure is not limited to the above example. Some of the pieces of information (frequency hopping, HARQ process ID, NDI, MCS, and RV) configured through the higher layer signal may be included in the PRI field information. In other words, the interpretation of the PRI field may vary depending on whether the HARQ-ACK information is transmitted on the PUCCH or the PUSCH by the new DCI field.

Method 10-3: In FIG. 10, when the first PUCCH 1000 and the second PUCCH 1002 are the first PUSCH and the second PUSCH, respectively, the terminal may be scheduled to transmit UL control information on the PUSCH or the PUCCH. When pieces of priority information of UL control information to be transmitted on the first PUCCH (or PUSCH) and the second PUCCH (or PUSCH) are the same, the terminal may transmit one piece of UL control information, which is obtained by multiplexing the UL control information to be transmitted, on one of the first PUCCH (or PUSCH) and the second PUCCH (or PUSCH).

Specifically, when the UL channels scheduled to transmit pieces of UL control information are the PUCCH and the PUSCH, all pieces of UL control information are transmitted on the PUSCH. When the UL channels scheduled to transmit pieces of UL control information are the PUCCH and the PUCCH, all pieces of UL control information are transmitted on one PUCCH resource, considering the total size of the UL control information and the ID of the latest scheduled PUCCH among the two PUCCHs. When the UL channels scheduled to transmit pieces of UL control information are the PUSCH and the PUSCH, the terminal transmits all pieces of UL control information on the latest scheduled PUSCH or the latest PUSCH resource in order of time. On the other hand, when the terminal is scheduled to transmit UL control information on the PUSCH or the PUCCH and pieces of priority information of UL control information to be transmitted on the first PUCCH (or PUSCH) and the second PUCCH (or PUSCH) are different from each other, the terminal may simultaneously transmit the pieces of UL control information on the first PUCCH (or PUSCH) and the second PUCCH (or PUSCH) without multiplexing the UL control information to be transmitted.

When the terminal supports all of methods 10-1, 10-2, and 10-3, the base station may set one of the methods described above by configuration through a higher layer signal, or when there is no configuration through a separate higher layer signal, the terminal may perform one of methods 10-1, 10-2, or 10-3 as a default operation. The configuration information through the higher layer signal may be configured in cell units or BWP units. Although the above description in FIG. 10 suggests a situation where an operation is performed in one cell, it is sufficiently applicable even in a multi-cell environment.

Therefore, in FIG. 10 described above, provided is a method of preventing a PUCCH having a small priority index value from being dropped when PUCCHs having different priority index values overlap in terms of time resources.

Figure 11:
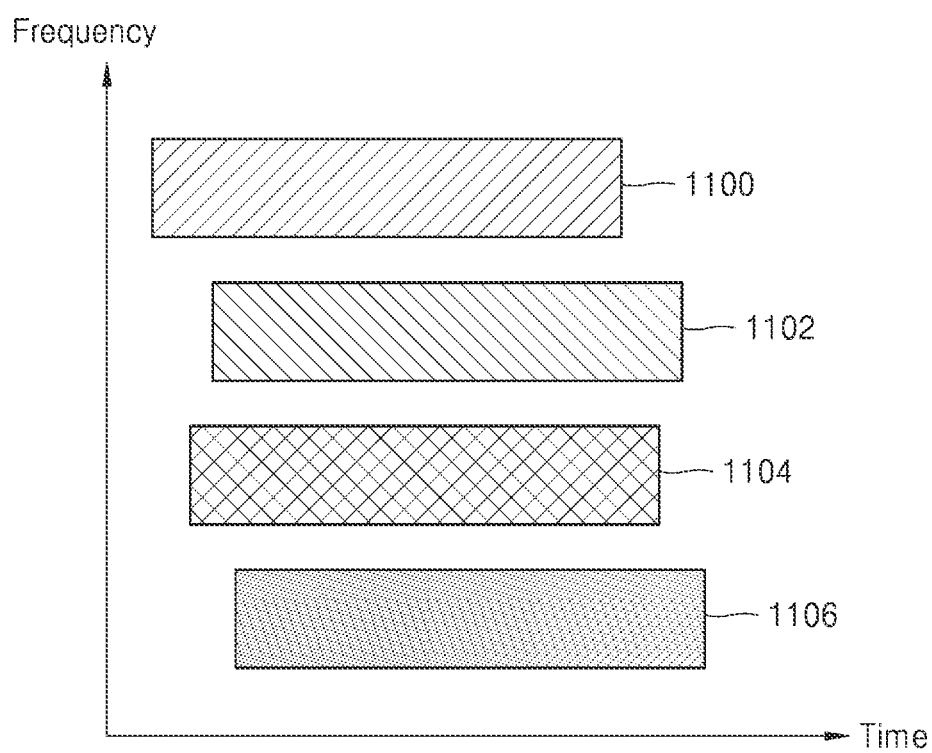
FIG. 11 is a diagram illustrating a situation where PUCCH scheduling and physical uplink shared channel (PUSCH) scheduling overlap each other, according to an embodiment of the present disclosure.

FIG. 11 is a diagram illustrating a situation where PUCCH scheduling and PUSCH scheduling overlap each other, according to an embodiment of the present disclosure.

FIG. 10 illustrates a situation where PUCCHs having two different priority index values overlap, and FIG. 11 illustrates a situation where PUCCHs and PUSCHs having two different priority index values overlap.

In FIG. 11, the first PUCCH 1100 is a PUCCH having a high priority index value, the second PUSCH 1102 is a PUSCH having a high priority index value, the second PUCCH 1104 is a PUCCH having a low priority index value, and the second PUSCH 1106 is a PUSCH having a low priority index value. When the terminal has the capability to not perform simultaneous PUCCH and PUSCH transmission in one cell, the terminal may transmit the UCI included in the PUCCHs having the same priority index value by piggybacking the UCI on the PUSCH. That is, the terminal may not transmit the PUCCH and may transmit the UCI included (or to be included) in the PUCCH on the PUSCH. Therefore, when PUSCHs having two different priority index values overlap after resolving the overlap between PUCCHs and PUSCHs having the same priority index value, the terminal may not transmit a PUSCH having a low priority index value.

When the terminal indicates the capability to simultaneously transmit the PUCCH and the PUSCH in one cell and receives higher layer signal configuration therefor from the base station, the terminal may not transmit a PUSCH having a small priority index value among the overlapped PUSCHs in terms of time resources for each PUSCH, and may not transmit a PUCCH having a small priority index value among the overlapped PUCCHs in terms of time resources for each PUCCH. Therefore, in FIG. 11, the terminal may simultaneously transmit only the first PUCCH 1100 and the first PUSCH 1102, and may not transmit the second PUCCH 1104 and the second PUSCH 1106. However, when the second PUCCH 1104 includes HARQ-ACK information, unnecessary PDSCH retransmission may be required. Therefore, it may be possible to transmit UL control information (e.g., HARQ-ACK information) included in the second PUCCH 1104 by at least one of the following methods.

Method 11-1: During PUSCH scheduling, the DCI field indicating information about whether to piggyback the UCI information of the PUCCH may be added to configure transmission, on the PUSCH, of the UCI information of the PUCCH. The DCI field may be included in the DL DCI format, or may be included in the UL DCI format.

In the case of the UL DCI format, a new DCI field indicating whether UCI information is included in the PUSCH scheduled by the UL DCI format may be added. The DCI field may be a bit having a value of 1 bit or more. For example, when the DCI field indicates to include the UCI information in the PUSCH and the transmission of the PUSCH overlaps the transmission of the PUCCH in terms of time resources, the terminal may transmit the UCI information included in the PUCCH by piggybacking the UCI information on the PUSCH. That is, the terminal may not transmit the PUCCH whose UCI information is indicated to be transmitted by being piggybacked on the PUSCH. Both the PUSCH and the PUCCH may have the same priority index value. When the DCI field does not indicate to include the UCI information in the PUSCH and the transmission of the PUSCH overlaps the transmission of the PUCCH in terms of time resources, the terminal may simultaneously transmit the PUCCH and the PUSCH. That is, the UCI information included in the PUCCH may not piggybacked on the PUSCH.

In case of the DL DCI format, a new DCI field indicating whether PUCCH information including HARQ-ACK information for the PDSCH scheduled by the DL DCI format is scheduled on the PUSCH may be included. The DCI field may have a value of 1 bit or more. When the DCI field indicates that the HARQ-ACK information is transmitted on the PUSCH and the transmission of HARQ-ACK information overlaps the transmission of another PUSCH in terms of time resources, the terminal transmits HARQ-ACK information by piggybacking the HARQ-ACK information on another PUSCH. Alternatively, when the HARQ-ACK information (the PUCCH including the HARQ-ACK information) indicated for piggybacking does not overlap the PUSCH on time resources, the HARQ-ACK information may be transmitted on the PUCCH even when indicated as PUSCH transmission by the DCI field. That is, the DCI field may be used to indicate whether HARQ-ACK information is piggybacked on the overlapping PUSCH or transmitted on the PUCCH.

Alternatively, when the transmission of HARQ-ACK information does not overlap other PUSCH on time resources as in the method described above with reference to FIG. 10, the HARQ-ACK information is transmitted on the PUSCH. On the other hand, when the DCI field indicates that the HARQ-ACK information is transmitted on the PUCCH, the terminal simultaneously transmits the PUCCH and the PUSCH even when the PUCCH including the HARQ-ACK information overlaps the PUSCH in terms of time resources. Method 11-1 assumes a situation where the terminal is configured to simultaneously transmit the PUSCH and the PUCCH in one serving cell.

Method 11-2: During PUSCH scheduling, an existing DCI field may be used to provide information about whether to piggyback the UCI information of the PUCCH. In the 3GPP NR standard, there is a 1-bit uplink shared channel (UL-SCH) indicator in DCI format 0_1. When the value of the UL-SCH indicator field of DCI indicates 1, UL-SCH is transmitted on the PUSCH. When the value of the UL-SCH indicator field of DCI indicates 0, the UL-SCH may not be transmitted on the PUSCH. When the terminal searches for DCI format 0_1, the UL-SCH indicator field in DCI format 0_1 indicates 0, and the CSI request field indicates a value other than 0, the terminal may ignore DCI fields other than the "CSI request" field, and the terminal may not transmit the PUSCH scheduled in DCI format 0_1. That is, only UCI information for a CSI report is included in the PUSCH to be transmitted. For example, the terminal may transmit only the UCI information for the CSI report on the PUSCH without transmitting the scheduled PUSCH. In other words, the terminal may transmit only UL control information (CSI report) without transmitting data information (e.g., user data or traffic data) on the PUSCH.

Conventionally, the terminal does not expect that the UL-SCH indicator field in DCI format 0_1 indicates 0 and the CSI request field indicates a value of 0. Therefore, unused values (the UL-SCH indicator field is set to 0, and the CSI report field is set to 0) are used to additionally indicate whether to piggyback HARQ-ACK information as well as CSI information on the scheduled PUSCH.

In a case where the terminal is able to simultaneously transmit the PUSCH and the PUCCH in one serving cell, and in a case where, when DCI format scheduling the PUSCH is 0_1 (or 0_x) and the DCI format includes the UL-SCH indicator and the CSI request field, both the UL-SCH indicator and the CSI request bit fields indicate 0, the terminal may transmit the UCI information included in the PUCCH by piggybacking the UCI information on the PUSCH when the scheduled PUSCH overlaps another PUCCH in terms of time resources. Therefore, the terminal may transmit only the PUSCH without transmitting the PUCCH.

Also, when the DCI format scheduling the PUSCH is 0_1 (or 0_x) and the DCI format includes the UL-SCH indicator and the CSI request field, in all cases except for the case where both the UL-SCH indicator and the CSI request bit fields indicate 0 (for example, when at least one of the UL-SCH indicator and the CSI request field is not present in the DCI format scheduling the PUSCH, or at least one of the UL-SCH indicator and the CSI request field indicates a value other than 0 in a situation where the two fields are present), the terminal may transmit both the PUCCH and the PUSCH even though the transmission of the PUCCH overlaps the transmission of the PUSCH in terms of time resources.

Alternatively, in a case where the terminal is able to simultaneously transmit the PUSCH and the PUCCH in one serving cell, and in a case where, when DCI format scheduling the PUSCH is 0_1 (or 0_x) and the DCI format includes the UL-SCH indicator and the CSI request field, both the UL-SCH indicator and the CSI request bit fields indicate 0, the terminal may transmit both the PUCCH and the PUSCH when the scheduled PUSCH overlaps another PUCCH in terms of time resources.

Also, when the DCI format scheduling the PUSCH is 0_1 (or 0_x) and the DCI format includes the UL-SCH indicator and the CSI request field, in all cases except for the case where both the UL-SCH indicator and the CSI request bit fields indicate 0 (for example, when at least one of the UL-SCH indicator and the CSI request field is not present in the DCI format scheduling the PUSCH, or at least one of the UL-SCH indicator and the CSI request field indicates a value other than 0 in a situation where the two fields are present), the terminal may transmit the UCI information included in the PUCCH by piggybacking the UCI information on the PUSCH. Therefore, the terminal may transmit only the PUSCH without transmitting the PUCCH.

Method 11-3: In a case where the terminal does not have the capability to simultaneously transmit the PUSCH and the PUCCH in one serving cell or does not receive the corresponding function from the base station even when having the capability, when a plurality of PUSCHs and PUCCHs overlap in terms of time resources, the terminal resolves the overlap between the PUSCH and the PUCCH having the same priority index value. Thereafter, when the PUSCH and the PUCCH, the PUCCH and the PUCCH, or the PUSCH and the PUSCH having different priority index values overlap in terms of time resources, the terminal may transmit one PUCCH or PUSCH having a high priority index value.

In a case where the terminal reports the capability to simultaneously transmit the PUSCH and the PUCCH in one serving cell and is configured with the corresponding function from the base station, when a plurality of PUSCHs and PUCCHs overlap in terms of time resources, the terminal resolves the overlap between the PUSCH and the PUCCH having the same priority index value. Thereafter, when the PUSCH and the PUCCH (method 11-3-1), the PUCCH and the PUCCH (method 11-3-2), or the PUSCH and the PUSCH (method 11-3-3) each having different priority index values overlap in terms of time resources, the terminal performs the following operations for each case.

Method 11-3-1: When the PUSCH and the PUCCH having different priority index values from each other overlap in terms of time resources, the terminal transmits both the PUSCH and the PUCCH.

Method 11-3-2: When the PUSCH and the PUSCH having different priority index values from each other overlap in terms of time resources, the terminal transmits the PUSCH having a high priority index value and does not transmit the PUSCH having a low priority index value. Instead, when the PUSCH having a low priority index value is a PUSCH on which the UCI is piggybacked, the terminal may transmit the PUCCH before overlapping. As a result, the terminal transmits the PUSCH having a high priority index value and does not transmit the PUSCH having a low priority index value. When the PUCCH having a low priority index value is present, the terminal may transmit the PUCCH having a low priority index value.

Method 11-3-3: When the PUCCH and the PUCCH having different priority index values from each other overlap in terms of time resources, the terminal may transmit the PUCCH having a high priority index value and may not transmit the PUCCH having a low priority index value.

Method 11-4: Whether to simultaneously transmit the PUCCH and PUSCH is determined according to the priority index value. The PUCCH and the PUSCH having large priority index values overlap and the terminal transmits one PUSCH in which UCI information of the PUCCH is piggybacked on the PUSCH. The overlapping of the PUCCH and the PUSCH having small priority index values may not be allowed, and simultaneous PUCCH and PUSCH transmission may be allowed. Therefore, after overlapping, when the PUSCH having a large priority index value overlaps the PUCCH and the PUSCH having small priority index values, the terminal transmits the PUSCH having a large priority index value and the PUCCH having a small priority index value, but does not transmit the PUSCH having a small priority index value.

Method 11-5: Whether to simultaneously transmit the PUCCH and the PUSCH is determined according to the type of UCI. In a case where UCI is type-A information, when the transmission of the PUCCH overlaps the transmission of the PUSCH in terms of time resources, the terminal transmits both the PUCCH and the PUSCH. In a case where UCI is type-B information, when the transmission of the PUCCH overlaps the transmission of the PUSCH in terms of time resources, the terminal piggybacks UCI information of the PUCCH on the PUSCH, and transmits the PUSCH without transmitting the PUCCH. The type-A information may be SR or CSI information. The type-B information may be HARQ-ACK information.

Method 11-6: A combination of method 11-4 and method 11-5 may be considered. The priority index value and the UCI information may be considered together. For example, in a case where the PUSCH and the PUCCH having large priority index values overlap in terms of time resources, the PUSCH and the PUCCH are multiplexed and transmitted as one PUSCH. In a case where the PUSCH and the PUCCH having small priority index values overlap in terms of time resources, when UCI included in the PUCCH is HARQ-ACK, the terminal simultaneously transmits the PUSCH and the PUCCH without multiplexing the PUSCH and the PUCCH. When the UCI included in the PUCCH is SR or CSI, the terminal may multiplex the PUSCH and the PUCCH, and may transmit one PUSCH.

In other words, when the time resources of scheduling of the PUSCH and the PUCCH having large priority index values overlap, only PUSCH may be transmitted by piggybacking the UCI of the PUCCH. When the time resources of scheduling of the PUSCH and the PUCCH having small priority index values overlap, whether to piggyback the UCI of the PUCCH may be determined, in consideration of the UCI type.

Method 11-7: Whether to simultaneously transmit the PUCCH and the PUSCH is determined according to the presence or absence of DCI format scheduling. The PUCCH or the PUSCH may be scheduled by the DCI format, or the terminal may periodically transmit the PUCCH or the PUSCH in a preset time resource domain without the DCI format. For example, in a case where the transmissions of the PUCCH and the PUSCH overlap in terms of time resources, when at least one of the PUCCH and the PUSCH is transmitted without scheduling by DCI format, the terminal may simultaneously transmit the PUCCH and the PUSCH without multiplexing. When the transmissions of the PUCCH and the PUSCH overlap in terms of time resources and both the PUCCH and the PUSCH are transmitted by scheduling based on the DCI format, the terminal may multiplex the PUCCH and the PUSCH and may transmit one PUSCH, but may not transmit the PUCCH. That is, UCI information included in the PUCCH may be piggybacked on the PUSCH.

Method 11-8: Whether to simultaneously transmit the PUCCH and the PUSCH is determined according to whether at least one of the PUCCH or the PUSCH is repeated transmission. In the case of the PUCCH or the PUSCH, the terminal repeatedly transmits UL control or data information according to a higher layer signal in advance without the DCI format, or repeatedly transmits UL control or data information according to the DCI format. For example, in a case where the transmissions of the PUCCH and the PUSCH overlap at least one symbol in terms of time resources, when at least one of the PUCCH and the PUSCH is scheduled for repeated transmission, the terminal may simultaneously transmit the PUCCH and the PUSCH without multiplexing. When the transmissions of the PUCCH and the PUSCH overlap at least one symbol in terms of time resources and both the PUCCH and the PUSCH are scheduled for single transmission, the terminal may be capable of performing at least one of the methods 11-1 to 11-7 described above.

For reference, the descriptions of FIGS. 10 and 11 are one embodiment, and are given separately for convenience of description.

Figure 12:
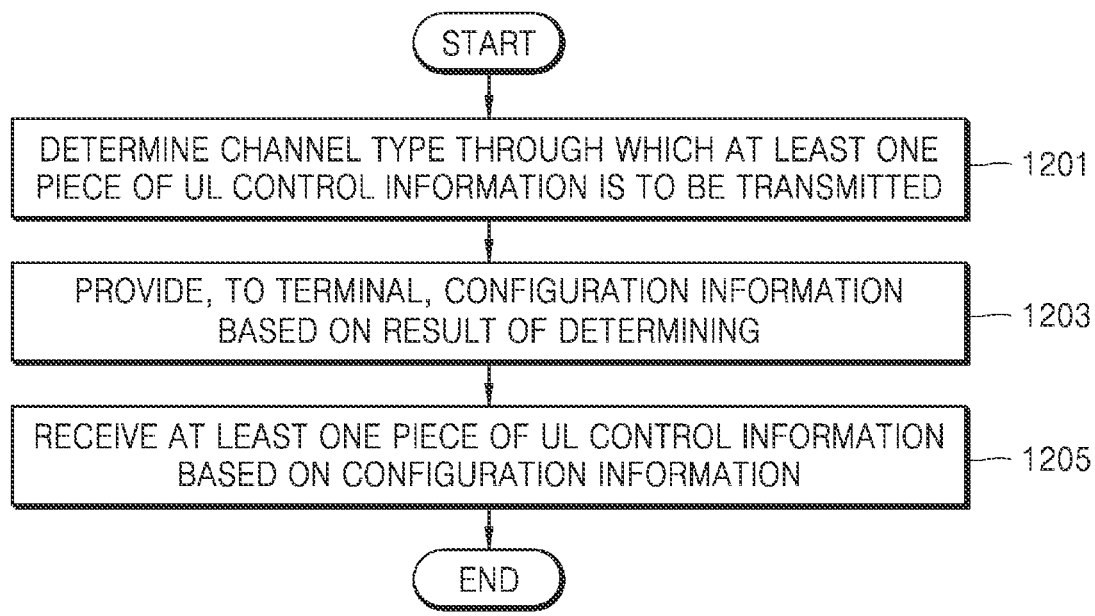
FIG. 12 is a flowchart of a scheduling method by a base station, according to an embodiment of the present disclosure.

FIG. 12 is a flowchart of a scheduling method by a base station, according to an embodiment of the present disclosure.

In operation 1201, the base station may determine a channel type through which at least one piece of UL control information is to be transmitted.

According to an embodiment of the present disclosure, the base station may determine to transmit at least one of the at least one piece of UL control information on a UL control channel, and may determine to transmit at least one of the at least one piece of UL control information on a UL data channel. For example, the base station may indicate the terminal to transmit first UL control information to be transmitted to the base station on a UL control channel (e.g., PUCCH), and to transmit second UL control information on a UL data channel (e.g., PUSCH).

Also, according to an embodiment of the present disclosure, the base station may multiplex the first UL control information and the second UL control information and indicate to transmit the multiplexed information on one UL control channel or one UL data channel.

According to an embodiment of the present disclosure, the channel type through which the UL control information is to be transmitted may be determined based on the priority of the UL control information. For example, when the priorities of UL control information are equal to each other, the base station may be configured to multiplex at least one piece of UL control information and transmit the multiplexed information on one UL control channel. The base station may be configured to transmit UL control information having a high priority on the UL data channel and to transmit UL control information having a low priority on the UL control channel.

Of course, the present disclosure is not limited to the above examples. The base station may be configured to transmit UL control information having a high priority on the UL control channel and to transmit UL control information having a low priority on the UL data channel. The priority of the UL control information may correspond to the UL control channel or the UL data channel.

Also, the base station may determine the channel type to be transmitted according to the type of the UL control information. Of course, the present disclosure is not limited to the above examples. For example, the base station may indicate to transmit HARQ-ACK information on the UL data channel and may indicate to transmit CSI information on the UL control channel.

In operation 1203, the base station may provide, to the terminal, configuration information based on a determination result.

According to an embodiment of the present disclosure, the base station may provide the configuration information through a certain field of DL control information. Of course, the present disclosure is not limited to the above examples, and the configuration information may be transmitted through a higher layer signal.

Also, according to an embodiment of the present disclosure, the resource for transmitting the UL data channel may be determined based on time and frequency resource information of a PRI field. In other words, when the base station is configured to transmit at least one piece of UL control information on the UL data channel, the terminal may transmit at least one piece of UL control information on the UL data channel based on the time and frequency resource information of the PRI field.

According to an embodiment of the present disclosure, the UL data channel may include at least one piece of UL control information without including data information (traffic data or user data). Of course, the present disclosure is not limited to the above examples, and at least one piece of UL control information may be transmitted by being piggybacked on the UL data channel including data information.

Also, according to an embodiment of the present disclosure, the configuration of frequency hopping information, HARQ process ID, new data indicator (NDI), MCS, and redundancy version (RV) information of the UL data channel for transmitting at least one piece of UL control information may be determined by information previously configured through a higher layer signal.

According to an embodiment of the present disclosure, the channel type through which the UL control information is to be transmitted may be determined based on the priority of the UL control information. For example, when the priorities of UL control information are equal to each other, the base station may be configured to multiplex at least one piece of UL control information and transmit the multiplexed information on one UL control channel. The base station may be configured to transmit UL control information having a high priority on the UL data channel and to transmit UL control information having a low priority on the UL control channel.

Of course, the present disclosure is not limited to the above examples. The base station may be configured to transmit UL control information having a high priority on the UL control channel and to transmit UL control information having a low priority on the UL data channel. The priority of the UL control information may correspond to the UL control channel or the UL data channel.

According to an embodiment of the present disclosure, the priority may refer to a priority index value. A high priority may be determined according to a magnitude comparison of a priority index between pieces of scheduled UL control information (or UL control channel or UL data channel).

Also, according to an embodiment of the present disclosure, the priority of the UL control information may be determined based on a service type. For example, the priority of UL control information (or UL control channel or UL data channel) corresponding to a URLLC service type may be higher than the priority of UL control information (or UL control channel or UL data channel) corresponding to an eMBB service type. Of course, the present disclosure is not limited to the above examples, and the priority may be determined according to the configuration of the base station.

Also, according to an embodiment of the present disclosure, the priority of the UL control information may be determined based on the type of the UL control information. For example, the priority of HARQ-ACK information may be higher than the priority of CSI information. Of course, the present disclosure is not limited to the above examples, and the priority may be determined according to the configuration of the base station.

In operation 1205, the base station may receive at least one piece of UL control information based on the configuration information.

According to an embodiment of the present disclosure, the base station may provide configuration information to the terminal, and may receive UL control information transmitted by the terminal, based on at least one of one UL control channel or one UL data channel.

Figure 13:
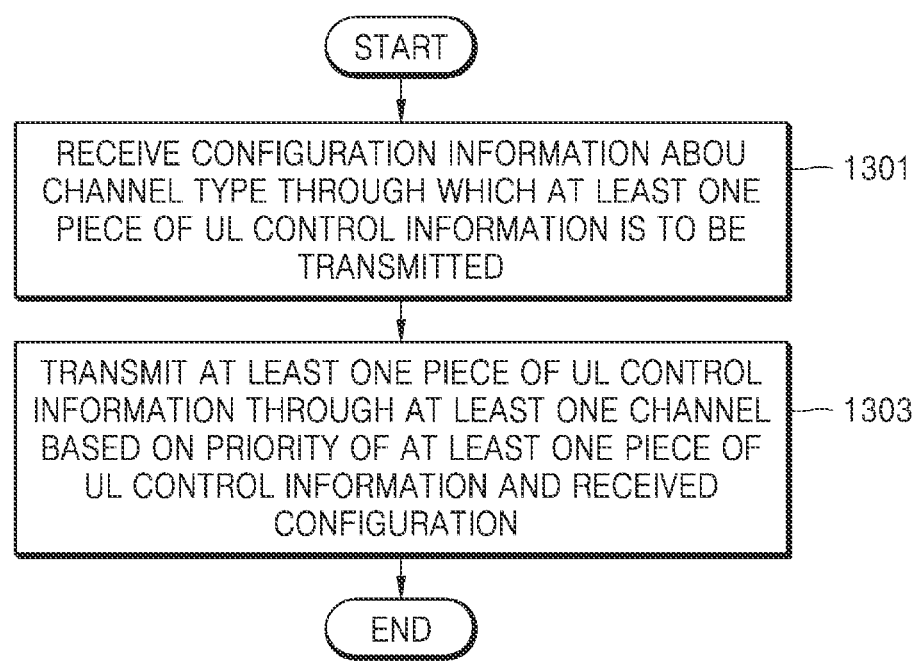
FIG. 13 is a flowchart of a method, performed by a terminal, of transmitting uplink control information, according to an embodiment of the present disclosure.

FIG. 13 is a flowchart of a method, performed by a terminal, of transmitting UL control information, according to an embodiment of the present disclosure.

In operation 1301, the terminal may receive configuration information about a channel type through which at least one piece of UL control information is to be transmitted.

Also, according to an embodiment of the present disclosure, the terminal may receive information (e.g., a priority index value) about the priority of at least one piece of UL control information (or UL control channel or UL data channel) priority information.

According to an embodiment of the present disclosure, configuration information may be provided through a certain field of DL control information. Of course, the present disclosure is not limited to the above examples, and the configuration information may be transmitted through a higher layer signal.

In operation 1303, the terminal may transmit at least one piece of UL control information through at least one channel based on the priority of at least one piece of UL control information and the received configuration information.

According to an embodiment of the present disclosure, when one of two or more pieces of UL control information having the same priority is configured to be transmitted on the UL control channel and one thereof is configured to be transmitted through the UL data channel, the terminal may transmit all pieces of the UL control information on the UL data channel.

According to an embodiment of the present disclosure, when two or more pieces of UL control information having the same priority are configured to be transmitted on the respective UL control channels, the terminal may multiplex the two or more pieces of UL control information and transmit the multiplexed information on one UL control channel. For example, the terminal may transmit all pieces of scheduled UL control information on one UL control channel, considering the total size of the UL control information and the identification information (e.g., ID) of the UL control channel scheduled the latest among the two UL control channels.

According to an embodiment of the present disclosure, when two or more pieces of UL control information having the same priority are configured to be transmitted on the respective UL control channels, the terminal may multiplex the two or more pieces of UL control information and transmit the multiplexed information on one UL data channel. For example, the terminal may transmit all pieces of scheduled UL control information on one UL data channel, considering the total size of the UL control information and the identification information (e.g., ID) of the UL data channel scheduled the latest among the two UL data channels (or the latest UL data channel in order of time).

Also, according to an embodiment of the present disclosure, when two or more pieces of UL control information having different priorities from each other are configured to be transmitted on the UL control channel or UL data, the terminal may transmit the two or more pieces of UL control information on different UL control channels, or may transmit only UL control information having the highest priority.

For example, the base station may transmit at least one of the at least one piece of UL control information on the UL control channel and may transmit at least one of the at least one piece of UL control information on the UL data channel. Also, the terminal may be capable of simultaneously transmitting the UL control channel and the UL data channel, may be capable of simultaneously transmitting two different UL control channels, and may be capable of simultaneously transmitting two different UL data channels.

Also, according to an embodiment of the present disclosure, when two or more pieces of UL control information having the same priority are configured to be transmitted on the UL control channel and the UL data channel, the terminal may multiplex the two or more pieces of UL control information and transmit the multiplexed information on one UL control channel.

In other words, the terminal may determine whether to multiplex and transmit UL control information according to the priority and the configuration of the base station, may determine which UL control information is to be transmitted on the UL control channel, and may determine which UL control information is to be transmitted on the UL data channel.

Figure 14:
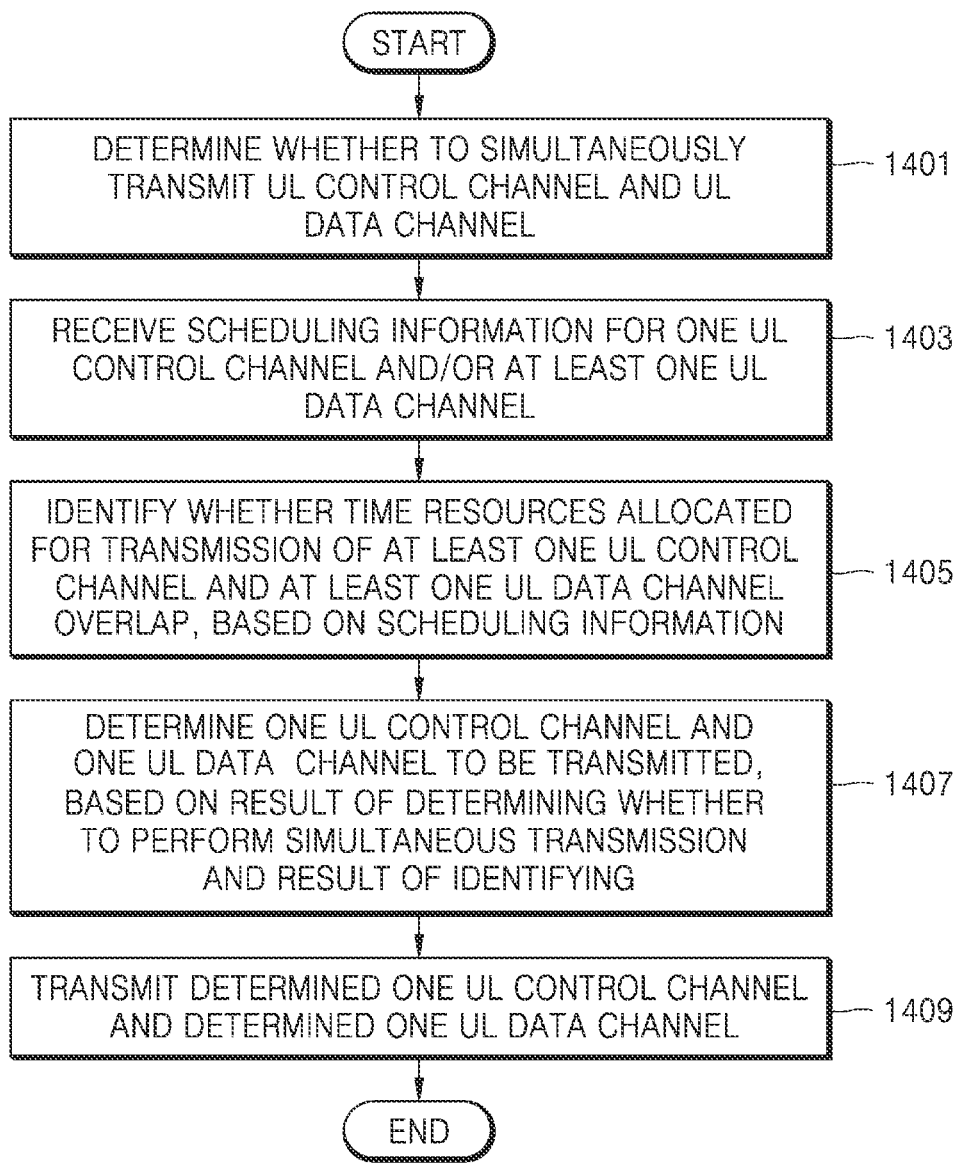
FIG. 14 is a flowchart of a method, performed by a terminal, of transmitting an uplink control channel and an uplink data channel, according to an embodiment of the present disclosure.

FIG. 14 is a flowchart of a method, performed by a terminal, of transmitting a UL control channel and a UL data channel, according to an embodiment of the present disclosure.

In operation 1401, the terminal may determine whether to simultaneously transmit the UL control channel and the UL data channel.

According to an embodiment of the present disclosure, the terminal may transmit, to the base station, performance information about whether to simultaneously transmit the UL control channel and the UL data channel, and may receive, from the base station, configuration information about simultaneous transmission of the UL control channel and the UL data channel. The terminal may determine whether to simultaneously transmit the UL control channel and the UL data channel based on the configuration information about simultaneous transmission of the UL control channel and the UL data channel, which is received from the base station.

In operation 1403, the terminal may receive scheduling information for one UL control channel and at least one UL data channel.

According to an embodiment of the present disclosure, the terminal may receive DL control information (UL DCI) including scheduling information of the UL control channel, and may receive DL control information (DL DCI) including scheduling information of the DL data channel.

In operation 1405, the terminal may identify whether time resources allocated for transmission of at least one UL control channel and at least one UL data channel overlap, based on the scheduling information.

According to an embodiment of the present disclosure, the terminal may determine whether time resources allocated for transmission of at least one UL control channel overlap, and may determine whether time resources allocated for transmission of at least one UL data channel overlap. Also, the terminal may determine whether time resources allocated for transmission of at least one UL control channel overlap time resources allocated for transmission of at least one UL data channel.

In operation 1407, the terminal may determine one UL control channel and one UL data channel to be transmitted, based on a result of determining whether to perform the simultaneous transmission and a result of the identifying.

According to an embodiment of the present disclosure, when time resources allocated for transmitting different UL data channels overlap, the terminal may select the UL data channel having the highest priority, and when time resources allocated for transmitting different UL control channels overlap, the terminal may select the UL data channel having the highest priority. However, when the UL control channel having the highest priority is piggybacked on the UL data channel, the terminal may select the UL control channel having the second highest priority. Of course, the present disclosure is not limited to the above examples. Even when the UL control channel having the highest priority is multiplexed with the UL data channel or another UL control channel, the terminal may select the UL control channel having the second highest priority.

According to an embodiment of the present disclosure, the terminal may transmit UL control information corresponding to the UL control channel having the highest priority by piggybacking the UL control information on the UL data channel, and may transmit UL control information corresponding to the UL control channel having no highest priority, without piggybacking on the UL data channel.

For example, when a UL control channel having a first priority, a UL data channel having a first priority, a UL control channel having a second priority, and a UL data channel having a second priority are scheduled, the terminal may transmit the UL control channel having the first priority by piggybacking the UL control channel on the UL data channel having the first priority, may transmit the UL control channel having the second priority, and may not transmit the UL data channel having the second priority.

Also, according to an embodiment of the present disclosure, the terminal may determine whether to transmit UL control information by piggybacking the UL control information on one UL data channel, based on at least one of a format of DL control information, a type of UL control information, and priorities of the UL control channel and the DL control channel. Also, according to an embodiment of the present disclosure, the terminal may determine whether to multiplex instead of whether to piggyback.

Also, according to an embodiment of the present disclosure, the terminal may determine whether to simultaneously transmit the UL control channel and the UL data channel according to whether at least one of the UL control channel or the UL data channel is repeated transmission. As described above, at least one of the UL control channel or the UL data channel may be scheduled by the DL control information or may be scheduled without the UL control information. When time resources scheduled to transmit the UL control channel and the UL data channel overlap in at least one symbol and at least one of the UL control channel and the UL data channel is scheduled for repeated transmission, the terminal may transmit the UL control channel and the UL data channel without multiplexing. For example, the terminal may transmit the UL control information in the UL control channel without piggybacking the UL control information on the UL data channel.

In operation 1409, the terminal may transmit the determined one UL control channel and the determined one UL data channel.

According to an embodiment of the present disclosure, when time resources allocated for transmitting UL data channels having different priorities from each other overlap, the terminal may select the UL data channel having the highest priority. Also, when time resources allocated for transmitting UL control channels having different priorities from each other overlap, the terminal may select the UL data channel having the highest priority. Also, when the UL control information included in the UL control channel is piggybacked (or multiplexed) on the UL data channel, the terminal may not select the UL control channel corresponding to the multiplexed UL control information.

Also, according to an embodiment of the present disclosure, whether to transmit the UL control information by piggybacking the UL control information on the UL data channel may be determined based on at least one field of DL control information. For example, the terminal may also determine whether to transmit the UL control information by piggybacking the UL control information on the UL data channel, further considering a result of determining whether the allocated time resources overlap. For example, the terminal may determine whether to transmit the UL control information by piggybacking the UL control information on the UL data channel, based on the UL-SCH indicator field and the CSI request field of the DL control information, and may determine whether to transmit the UL control information by piggybacking the UL control information on the UL data channel, based on a certain field (e.g., a newly added field) of the DL control information.

For reference, the descriptions of FIGS. 13 and 14 are an embodiment of the operation of the terminal. That is, the descriptions are given separately for convenience of description, and may correspond to the descriptions of FIGS. 10 and 11.

Figure 15:
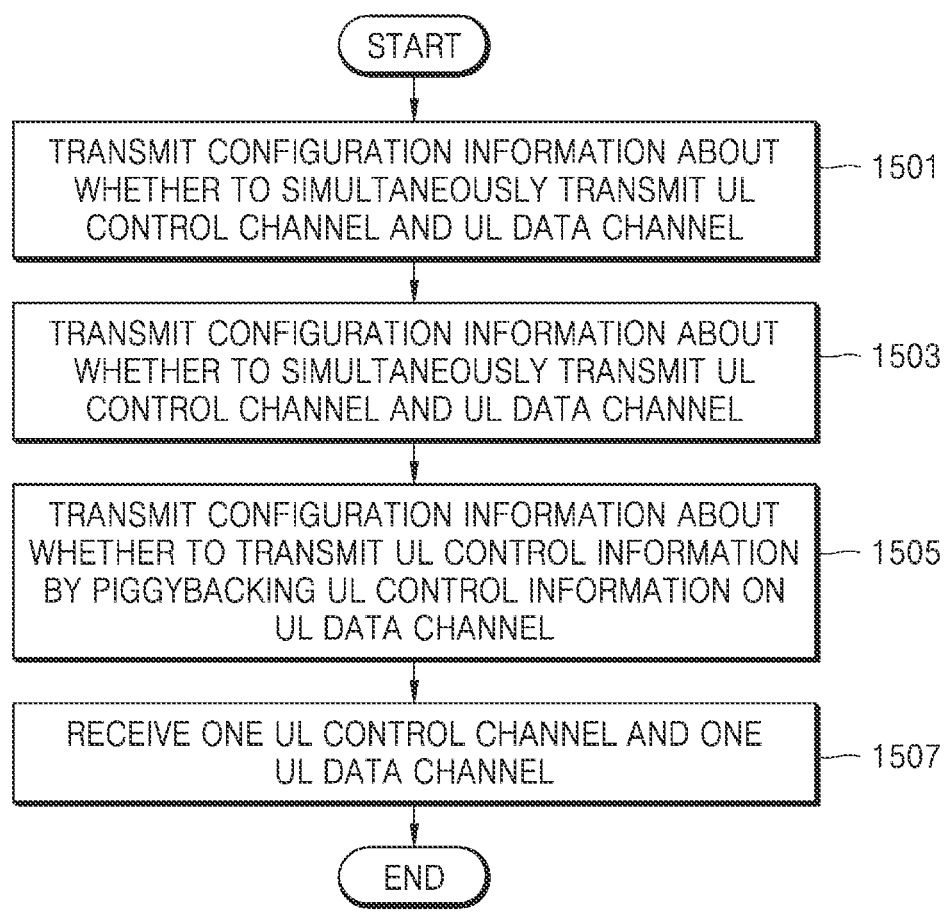
FIG. 15 is a flowchart of a method, performed by a base station, of scheduling an uplink control channel and an uplink data channel, according to an embodiment of the present disclosure.

FIG. 15 is a flowchart of a method, performed by a base station, of scheduling a UL control channel and a UL data channel, according to an embodiment of the present disclosure.

In operation 1501, the base station may determine a channel type through which at least one piece of UL control information is to be transmitted.

According to an embodiment of the present disclosure, the base station may determine the channel type through which the UL control information is to be transmitted according to the priority of the UL control information or the type of the UL control information. For example, the base station may determine to transmit first UL control information on the UL control channel and transmit second UL control information on the UL data channel.

In operation 1503, the base station may transmit configuration information about whether to simultaneously transmit the UL control channel and the UL data channel.

According to an embodiment of the present disclosure, the base station may receive, from the terminal, performance information about whether to simultaneously transmit the UL control channel and the UL data channel, and may transmit, to the terminal, configuration information about simultaneous transmission of the UL control channel and the UL data channel.

In operation 1505, the base station may transmit configuration information about whether to transmit the UL control information by piggybacking the UL control information on the UL data channel.

According to an embodiment of the present disclosure, the base station may transmit configuration information about whether to transit the UL control information by piggybacking the UL control information on the UL data channel, and may transmit configuration information about whether to transmit the UL control information by multiplexing the UL control information on a certain UL control channel or a certain UL data channel.

In operation 1507, the base station may transmit scheduling information for at least one UL control channel and at least one UL data channel.

In operation 1509, the base station may receive one UL control channel and one UL data channel.

Figure 16:
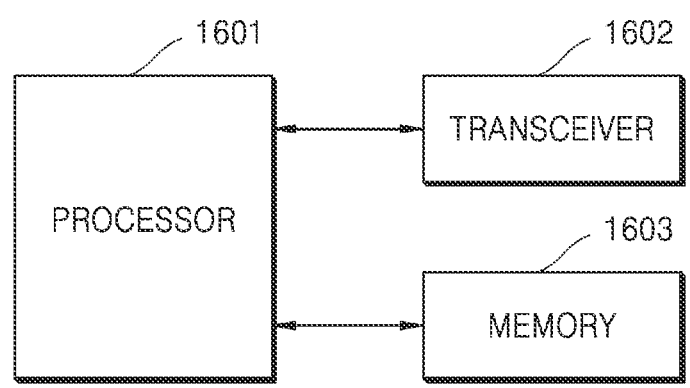
FIG. 16 is a diagram schematically illustrating a structure of a terminal, according to embodiments of the present disclosure.

FIG. 16 is a diagram schematically illustrating a structure of a terminal, according to embodiments of the present disclosure.

Referring to FIG. 16, the terminal may include a processor 1601, a transceiver 1602, and a memory 1603. Of course, the present disclosure is not limited to the above example, and the terminal may include fewer elements or more elements than the elements illustrated in FIG. 16. Also, the processor 1601, the transceiver 1602, and the memory 1603 may be implemented as a single chip. In the present disclosure, the processor 1601 may be defined as a circuit, an application-specific integrated circuit, or at least one processor. Of course, the present disclosure is not limited to the above examples.

The processor 1601 according to an embodiment of the present disclosure may control overall operations of the terminal. For example, the processor 1601 may control a signal flow between blocks in order to perform the operations according to the flowcharts described above. Also, the processor 1601 may write data to and read data from the memory 1603. The processor 1601 may perform functions of a protocol stack required in the communication standards. To this end, the processor 1601 may include at least one processor or microprocessor, or may be a part of the processor. Also, a part of the transceiver 1602 and the processor 1601 may be referred to as a communication processor (CP).

According to an embodiment of the present disclosure, the processor 1601 may control the operations of the terminal described with reference to FIGS. 1 to 15.

The processor 1601 according to an embodiment of the present disclosure may execute the program stored in the memory 1603 to control the transceiver 1602 to receive configuration information about the channel type through which at least one piece of UL control information is to be transmitted, and transmit at least one piece of UL control information on at least one channel based on the received configuration information and the priority of the at least one piece of UL control information.

Also, the processor 1601 according to an embodiment of the present disclosure may execute the program stored in the memory 1603 to control the transceiver 1602 to determined whether to simultaneously transmit the UL control channel and the UL data channel, to receive scheduling information for at least one UL control channel and at least one UL data channel, to identify whether time resources allocated for transmission of at least one UL control channel and at least one UL data channel overlap, based on the scheduling information, to determine one UL control channel and one UL data channel to be transmitted, based on a result of determining whether the simultaneous transmission is performed and a result of the identifying, and to transmit the determined one UL control channel and the determined one UL data channel.

The transceiver 1602 according to an embodiment of the present disclosure may perform functions for transmitting and receiving signals through a radio channel. For example, the transceiver 1602 may perform a conversion function between a baseband signal and a bit stream according to a physical layer standard of a system. For example, upon transmission of data, the transceiver 1602 may encode and modulate a transmission bit stream to generate complex symbols. Also, upon reception of data, the transceiver 1602 may demodulate and decode a baseband signal to reconstruct a reception bit stream. Also, the transceiver 1602 may up-convert the baseband signal into an RF band signal and transmit the RF band signal through an antenna, and may down-convert the RF band signal received through the antenna into the baseband signal. For example, the transceiver 1602 may include a transmission filter, a reception filter, an amplifier, a mixer, an oscillator, a digital-to-analog converter (DAC), an analog-to-digital converter (ADC), and the like. Also, the transceiver 1602 may include a plurality of transmission/reception paths. Furthermore, the transceiver 1602 may include at least one antenna array including a plurality of antenna elements. In terms of hardware, the transceiver 1602 may include a digital circuit and an analog circuit (e.g., a radio frequency integrated circuit (RFIC)). The digital circuit and the analog circuit may be implemented as a single package. Also, the transceiver 1602 may include a plurality of RF chains.

The memory 1603 according to an embodiment of the present disclosure may store data such as configuration information, a basic program, and an application program for the operations of the terminal. The memory 1603 may include a volatile memory, a non-volatile memory, or a combination of a volatile memory and a non-volatile memory. The memory 1603 may provide the stored data in response to the request of the processor 1601. The memory 1603 may store information transmitted and received through the transceiver 1602 and/or information generated through the processor 1601.

Figure 17:
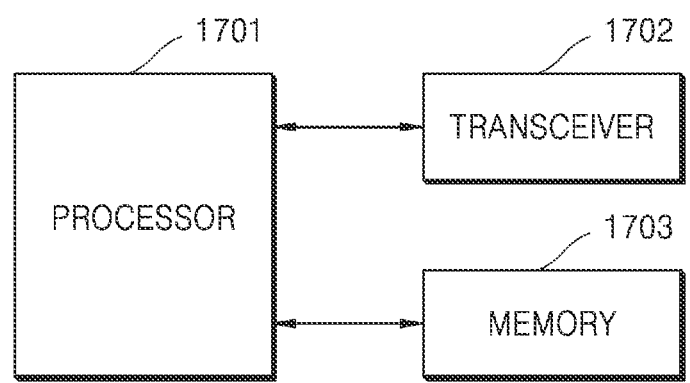
FIG. 17 is a diagram schematically illustrating a structure of a base station, according to embodiments of the present disclosure.

FIG. 17 is a diagram schematically illustrating a structure of a base station, according to embodiments of the present disclosure.

Referring to FIG. 17, the base station may include a processor 1701, a transceiver 1702, and a memory 1703. Of course, the present disclosure is not limited to the above example, and the base station may include fewer elements or more elements than the elements illustrated in FIG. 17. Also, the processor 1701, the transceiver 1702, and the memory 1703 may be implemented as a single chip. In the present disclosure, the processor may be defined as a circuit, an application-specific integrated circuit, or at least one processor. Of course, the present disclosure is not limited to the above examples.

The processor 1701 according to an embodiment of the present disclosure may control overall operations of the base station. For example, the processor 1701 may control a signal flow between blocks in order to perform the operations according to the flowcharts described above. Also, the processor 1701 may write data to and read data from the memory 1703. The processor 1701 may perform functions of a protocol stack required in the communication standards. To this end, the processor 1701 may include at least one processor or microprocessor, or may be a part of the processor. Also, a part of the transceiver 1702 and the processor 1701 may be referred to as a CP.

According to an embodiment of the present disclosure, the processor 1701 may control the operations of the base station described with reference to FIGS. 1 to 15.

According to an embodiment of the present disclosure, the processor 1701 may execute the program stored in the memory 1703 to control the transceiver 1702 to determine a channel type through which at least one piece of UL control information is to be transmitted, to provide, to the terminal, configuration information based on a result of the determining, and to receive at least one piece of UL control information based on the configuration information. Also, according to an embodiment of the present disclosure, the processor 1701 may execute the program stored in the memory 1703 to control the transceiver 1702 to transmit configuration information about whether to simultaneously transmit a UL control channel and a UL data channel, to transmit configuration information about whether to transmit UL control information by piggybacking the UL control information on the UL data channel, to transmit scheduling information for at least one UL control channel and at least one UL data channel, and to receive one UL control channel and one UL data channel.

The transceiver 1702 according to an embodiment of the present disclosure may perform functions for transmitting and receiving signals through a radio channel. For example, the transceiver 1702 may perform a conversion function between a baseband signal and a bit stream according to a physical layer standard of a system. For example, upon transmission of data, the transceiver 1702 may encode and modulate a transmission bit stream to generate complex symbols. Also, upon reception of data, the transceiver 1702 may demodulate and decode a baseband signal to reconstruct a reception bit stream. Also, the transceiver 1702 may up-convert the baseband signal into an RF band signal and transmit the RF band signal through an antenna, and may down-convert the RF band signal received through the antenna into the baseband signal. For example, the transceiver 1702 may include a transmission filter, a reception filter, an amplifier, a mixer, an oscillator, a DAC, an ADC, and the like. Also, the transceiver 1702 may include a plurality of transmission/reception paths. Furthermore, the transceiver 1702 may include at least one antenna array including a plurality of antenna elements. In terms of hardware, the a transceiver 1702 may include a digital circuit and an analog circuit (e.g., a RFIC). The digital circuit and the analog circuit may be implemented as a single package. Also, the transceiver 1702 may include a plurality of RF chains.

The memory 1703 according to an embodiment of the present disclosure may store data such as configuration information, a basic program, and an application program for the operations of the base station. The memory 1703 may include a volatile memory, a non-volatile memory, or a combination of a volatile memory and a non-volatile memory. The memory 1703 may provide the stored data in response to the request of the processor 1701. The memory 1703 may store information transmitted and received through the transceiver 1702 and/or information generated through the processor 1701.

The methods according to the embodiments of the present disclosure, which are described in the claims or the detailed description, may be implemented as hardware, software, or a combination of hardware and software.

When implemented as software, a computer-readable storage medium or a computer program product storing one or more programs (software modules) may be provided. One or more programs stored in the computer-readable storage medium or the computer program product are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in random access memory (RAM), non-volatile memory including flash memory, read-only memory (ROM), electrically erasable programmable read-only memory (EEPROM), magnetic disc storage devices, compact disc-ROM (CD-ROM), digital versatile discs (DVDs), other types of optical storage devices, or magnetic cassette. Alternatively, one or more programs may be stored in a memory provided by a combination of all or part of these devices. Also, each memory may include a plurality of configured memories.

Also, the programs may be stored in an attachable storage device that is accessible through a communication network such as Internet, Intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiments of the present disclosure.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, the embodiments of the present disclosure, which are described in this specification and drawings, are merely presented as specific examples so as to easily explain the technical idea of the present disclosure and help the understanding of the present disclosure and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, the base station and the terminal may operate in combination of portions of the first embodiment, the second embodiment, and the third embodiments of the present disclosure. Also, although the above-described embodiments have been presented based on the NR system, other modifications based on the technical idea of the embodiments may also be applied to other systems such as FDD or TDD LTE systems.

Also, preferred embodiments of the present disclosure have been described and illustrated in the present specification and drawings. Although certain terms are used herein, this is merely used in a general sense to easily describe the technical idea of the present disclosure and to help understanding of the present disclosure, and is not intended to limit the scope of the present disclosure. It will be obvious to those of ordinary skill in the art that other modifications based on the technical idea of the present disclosure may be made.

The invention claimed is:

1. A method performed by a user equipment (UE) in a wireless communication system, the method comprising:
receiving, via radio resource control (RRC) signaling, configuration information indicating that simultaneous transmission of physical uplink control channel (PUCCH) and physical uplink shared channel (PUSCH) with different priorities is enabled;
identifying a PUCCH with a first priority index and a PUSCH with a second priority index which overlap in time, wherein the first priority index and the second priority index are different;
in case that the UE supports the simultaneous transmission of the PUCCH and the PUSCH with the different priorities on different cells in inter-band carrier aggregation, transmitting respective of the PUCCH with the first priority index and the PUSCH with the second priority index simultaneously on the different cells in the inter-band carrier aggregation, based on the configuration information; and
in case that the simultaneous transmission of the PUCCH and the PUSCH is not supported at the UE and the PUCCH and the PUSCH overlap in time, transmitting the PUSCH or the PUCCH of a larger priority index.

2. The method of claim 1, further comprising:
transmitting UE capability information indicating a support of the simultaneous transmission of the PUCCH and the PUSCH.

3. A method performed by a base station (BS) in a wireless communication system, the method comprising:
transmitting, via radio resource control (RRC) signaling, configuration information indicating that simultaneous transmission of physical uplink control channel (PUCCH) and physical uplink shared channel (PUSCH) with different priorities is enabled;
in case that the simultaneous transmission of the PUCCH and the PUSCH with the different priorities on different cells in inter-band carrier aggregation is supported at a user equipment (UE), receiving respective of the PUCCH with a first priority index and the PUSCH with a second priority index simultaneously from the UE on the different cells in the inter-band carrier aggregation, based on the configuration information; and
in case that the simultaneous transmission of the PUCCH and the PUSCH is not supported at the UE and the PUCCH and the PUSCH overlap in time, receiving, from the UE, the PUSCH or the PUCCH of a larger priority index,
wherein the first priority index and the second priority index are different.

4. The method of claim 3, further comprising:
receiving UE capability information indicating a support of the simultaneous transmission of the PUCCH and the PUSCH.

5. A user equipment (UE) in a wireless communication system, the UE comprising:
a transceiver; and
a processor coupled with the transceiver and configured to:
receive, via radio resource control (RRC) signaling, configuration information indicating that simultaneous transmission of physical uplink control channel (PUCCH) and physical uplink shared channel (PUSCH) with different priorities is enabled, identify a PUCCH with a first priority index and a PUSCH with a second priority index which overlap in time, wherein the first priority index and the second priority index are different, in case that the UE supports the simultaneous transmission of the PUCCH and the PUSCH with the different priorities on different cells in inter-band carrier aggregation, transmit respective of the PUCCH with the first priority index and the PUSCH with the second priority index simultaneously on the different cells in the inter-band carrier aggregation, based on the configuration information, and in case that the simultaneous transmission of the PUCCH and the PUSCH is not supported at the UE and the PUCCH and the PUSCH overlap in time, transmit the PUSCH or the PUCCH of a larger priority index.

6. The UE of claim 5, wherein the processor is further configured to:

transmit UE capability information indicating a support of the simultaneous transmission of the PUCCH and the PUSCH.

7. A base station (BS) in a wireless communication system, the BS comprising:

a transceiver; and a processor coupled with the transceiver and configured to:

transmit, via radio resource control (RRC) signaling, configuration information indicating that simultaneous transmission of physical uplink control channel (PUCCH) and physical uplink shared channel (PUSCH) with different priorities is enabled, in case that the simultaneous transmission of the PUCCH and the PUSCH with the different priorities on different cells in inter-band carrier aggregation is supported at a user equipment (UE), receive respective of the PUCCH with a first priority index and the PUSCH with a second priority index simultaneously from the UE on the different cells in the inter-band carrier aggregation, based on the configuration information, and in case that the simultaneous transmission of the PUCCH and the PUSCH is not supported at the UE and the PUCCH and the PUSCH overlap in time, receive, from the UE, the PUSCH or the PUCCH of a larger priority index, wherein the first priority index and the second priority index are different.

8. The BS of claim 7, wherein the processor is further configured to:

receive UE capability information indicating a support of the simultaneous transmission of the PUCCH and the PUSCH.

* * * * *